(12) United States Patent
Morioka

(10) Patent No.: US 12,394,354 B2
(45) Date of Patent: Aug. 19, 2025

(54) DISPLAY DEVICE AND METHOD FOR CONTROLLING DISPLAY DEVICE

(71) Applicant: SHARP KABUSHIKI KAISHA, Osaka (JP)

(72) Inventor: Hirohito Morioka, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/985,049

(22) Filed: Nov. 10, 2022

(65) Prior Publication Data

US 2023/0154379 A1    May 18, 2023

(30) Foreign Application Priority Data

Nov. 17, 2021    (JP) ................. 2021-187015

(51) Int. Cl.
*G09G 3/20* (2006.01)
*H04N 1/00* (2006.01)

(52) U.S. Cl.
CPC ... *G09G 3/2092* (2013.01); *G09G 2340/0442* (2013.01); *G09G 2340/14* (2013.01); *H04N 1/00464* (2013.01); *H04N 1/00506* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 10,049,477 B1* | 8/2018 | Kokemohr | G06T 11/001 |
| 10,782,852 B1* | 9/2020 | Al Majid | H04L 51/10 |
| 2015/0029090 A1* | 1/2015 | Kim | G06F 3/017 |
| | | | 345/156 |
| 2015/0067484 A1* | 3/2015 | Sumio | G06F 40/106 |
| | | | 715/251 |
| 2022/0129085 A1* | 4/2022 | Igarashi | G06F 3/04817 |

FOREIGN PATENT DOCUMENTS

| | | |
|---|---|---|
| EP | 0737587 A2 | 10/1996 |
| JP | H08137866 A | 5/1996 |
| JP | H09-062247 A | 3/1997 |
| JP | 2006-018700 A | 1/2006 |
| JP | 2012-137578 A | 7/2012 |

* cited by examiner

*Primary Examiner* — Daniel F Hajnik
*Assistant Examiner* — Jed-Justin Imperial
(74) *Attorney, Agent, or Firm* — ScienBiziP, P.C.

(57) ABSTRACT

This display device includes a display and a controller. The controller provisionally places an object on a display area of the display, determines a display size of the object that allows the object to be contained within the display area by comparing a size of the object with a size of the display area, and renders the object in the display area using the thus determined display size of the object.

8 Claims, 23 Drawing Sheets

FIG. 3

| MINIMUM SYSTEM CHARACTER SIZE | 12px |
|---|---|
| MINIMUM WIDTH-CONDENSABLE CHARACTER SIZE | 15px |
| MINIMUM WIDTH CONDENSATION RATIO | 65% |

FIG. 11A

Abc def

FIG. 11B

Abc def

FIG. 13A

Abc def ghi jklm

FIG. 13B

Abc def ghi...

FIG. 13C

Abc def ghi...

JKLMNOP

QRSTU

VWXYZ12

VWXYZ12

JKLMNOP

QRSTU

JKLMNOP

QRSTU

VWXYZ

VWXYZ

DISPLAY DEVICE AND METHOD FOR CONTROLLING DISPLAY DEVICE

BACKGROUND OF THE INVENTION

Field of the Invention

The present disclosure relates to a display device and the like.

Description of the Background Art

Conventionally, various devices have been available that include a display for displaying characters such as text and numbers. Various techniques have also been proposed to appropriately display characters.

For example, it is known in the art to place characters within a line having a predetermined line width by: obtaining a total allowable character spacing compression amount for a string of characters to be placed and an excess over the line width expected to result from the string of characters being placed with a basic character spacing; calculating a difference between the excess and the total allowable character spacing compression amount if the total allowable character spacing compression amount is smaller than the excess; obtaining an additional compression amount to be given to every character spacing in the string of characters based on the calculated difference; determining a character spacing compression amount based on a character-specific allowable compression amount and the additional compression amount; and placing the characters using the thus determined compression amount.

When displaying text (character string) on a display device included in an apparatus such as an image forming apparatus, it is necessary to place the text within a predetermined display area while ensuring readability of characters therein as much as possible. In order to increase the readability, it is necessary to specify a largest possible character size for the text. To this end, an advance verification needs to be performed on a case-by-case basis to specify a character size that allows text to just fit in the display area.

In recent years, web browsers are increasingly used as display engines for device-specific screens. However, in a case where a general-purpose display engine such as a web browser is used, it is difficult to predict in advance results of display of various types of text, and it is difficult to define in advance sizes for displaying text and other objects in an optimal manner.

Web browsers support advanced line setting and layout processing for text in order to achieve high-quality display, and operation thereof conforms to specifications defined by the World Wide Web Consortium (W3C). However, the range of supported functions varies from web browser to web browser. Even web browsers supporting the same functions can often have slight differences in control therebetween. Furthermore, operation of the same web browser can vary from version to version due to the influence of functional improvements or failures. It is impossible to simulate a display process with full knowledge of behaviors of a web browser.

With the recent diversification of display devices, such as smartphones and tablets, more content is created so as to automatically adjust display layout according to sizes of various display devices. Such content, which is commonly described with the term "responsive design", can cause a dynamic change in size of a text display area to adjust to the size of the area over which the content is displayed. This size change can cause the text to extend beyond the display area in which the text is to be displayed, resulting in a scroll area or a resultant overflow portion being cut off and omitted. In order to avoid such a situation, it is necessary to consider various conditions, and then specify a character size small enough to be safe. However, determining a character size by assuming worst-case scenarios results in a failure to make full use of the text display area in many cases where none of the worst-case scenarios occur. This creates a number of situations in which text is displayed in a smaller size than an optimal character size, reducing the readability.

Methods for controlling the character size include a method involving changing, according to the number of characters to be displayed, the character size to be applied to the display. This method is used in a case where text is displayed in a predetermined display area and the number of characters in the text to be displayed varies widely. According to this method, for example, text is displayed using a character size of 24 px for up to 5 characters, 20 px for 6 to 10 characters, anal 18 px for more characters. The above-described control method is used to display phone numbers of cell phones and the like. However, such a control method is applicable only in the cases where the concept of word wrap does not matter, characters to be entered are limited to numbers and some symbols, and the width needed for display is easily calculated from the number of characters to be displayed, such as in the case of phone numbers. As for word strings and sentences that contain a variety of characters and have indefinite text lengths, it is difficult to predict in advance the width of the area needed for display, making it difficult to determine a threshold for changing the character size. In particular, in the case of alphanumeric text, word wrap occurs at a delimiter such as a space, and thus a slight change in character size can change word wrap positions in all lines, leading to a significant change in the number of lines displayed. This makes it even more difficult to adjust the character size for an area in which a plurality of lines are displayable. As a result, there is no choice but to be completely safe in specifying a character size for characters to be displayed in the display area, unavoidably leaving the possibility that text is displayed using an unnecessarily small character size even if the character size is changed in multiple stages.

Furthermore, globalization has made it common to display content in more than 20 languages. In such a case, the text resource is switched for each language to display the content. However, for deploying a user interface (UI) having a number of screens in multiple languages, it is not practical to verify and define in advance an optimal character size on a language-by-language basis for each text display location, because such an approach not only requires time and efforts but also increases definition data. It is not impossible to verify in advance appropriate character sizes for fixed names and messages that are prestored. However, it is impossible to verify in advance appropriate character sizes for displaying user data, user-customizable data, or text dynamically acquired from external sources.

As described above, it is difficult to define in advance a character size and style of text in an optimal manner. None of existing techniques take into account such a problem.

In view of the above-described problem, it is an objective of the present disclosure to provide a display device and the like capable of appropriately displaying an object in a display area.

SUMMARY OF THE INVENTION

In order to solve the above-described problem, the present disclosure provides a display device including a display and a controller. The controller provisionally places an object on a display area of the display, determines a display size of the object that allows the object to be contained within the display area by comparing a size of the object with a size of the display area, and renders the object in the display area using the thus determined display size of the object.

The present disclosure also provides a method for controlling a display device. The method includes: provisionally placing an object on a display area; determining a display size of the object that allows the object to be contained within the display area by comparing a size of the object with a size of the display area; and rendering the object in the display area using the thus determined display size of the object.

According to the present disclosure, it is possible to provide a display device and the like capable of appropriately displaying an object in a display area.

BRIEF DESCRIPTION OF THE DRAWINGS

FIG. 3 is a diagram showing an example of a data structure of a setting table according to the first embodiment.

FIGS. 11A and 11B are diagrams illustrating an operation example according to the first embodiment.

FIGS. 13A to 13C are diagrams illustrating an operation example according to the first embodiment.

DESCRIPTION OF THE PREFERRED EMBODIMENTS

The following describes embodiments for carrying out the present disclosure with reference to the accompanying drawings. Note that the embodiments described below are examples for explaining the present disclosure, and the technical scope of the present disclosure set forth in the claims is not limited to the following description.

1. First Embodiment

First, a first embodiment will be described. In the first embodiment described below, a display device according to the present disclosure is applied to an image forming apparatus 10. The image forming apparatus 10 is an information processing apparatus having functions such as a copying function, a scanning function, and a document printing function, and is also referred to as a multi-function printer/peripheral (MFP).

1.1. Functional Configuration

Figure 1:
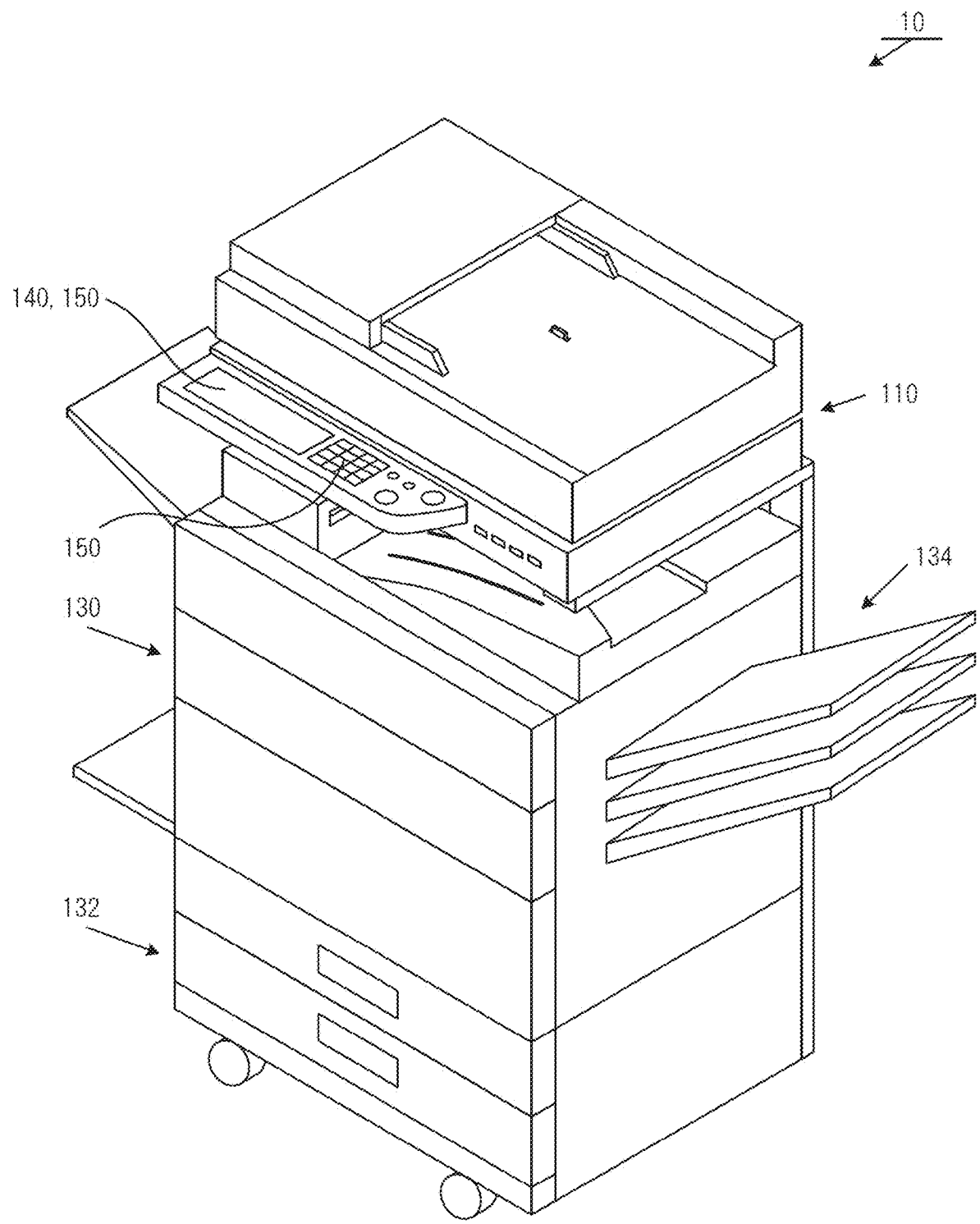
FIG. 1 is an external perspective view of an image forming apparatus according to a first embodiment.
Figure 2:
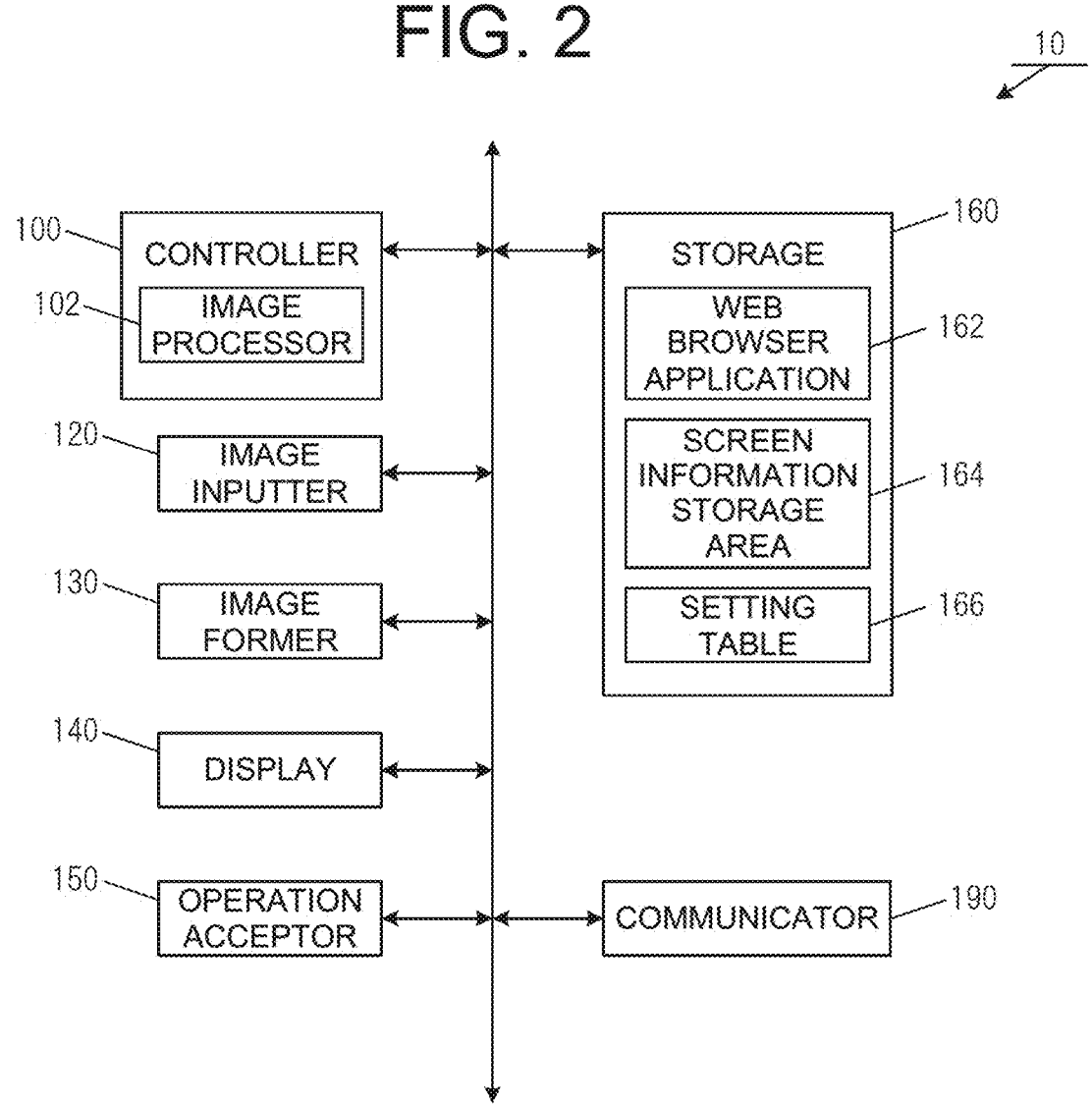
FIG. 2 is a diagram illustrating a functional configuration of the image forming apparatus according to the first embodiment.

The following describes the first embodiment with reference to the drawings. FIG. 1 is an external perspective view of the image forming apparatus 10 according to the first embodiment. FIG. 2 is a block diagram illustrating a functional configuration of the image forming apparatus 10.

As illustrated in FIG. 2, the image forming apparatus 10 includes a controller 100, an image inputter 120, an image former 130, a display 140, an operation acceptor 150, a storage 160, and a communicator 190.

The controller 100 is a functional element that performs overall control of the image forming apparatus 10. The controller 100 reads and executes various programs stored in the storage 160 to implement various functions, and includes, for example, one or more computing devices (central processing unit (CPU)). The controller 100 may be configured as a system on a chip (SoC) having a plurality of functions among the functions described below.

The controller 100 functions as an image processor 102 by executing a program stored in the storage 160. The image processor 102 performs various image-related processes. For example, the image processor 102 performs a sharpening process and a tone conversion process on an image inputted by the image inputter 120.

The image inputter 120 inputs image data to the image forming apparatus 10. For example, the image inputter 120 includes a scanner device or the like capable of reading an image and generating image data. The scanner device converts the image into an electrical signal using, for example, an image sensor such as a charge coupled device (CCD) or a contact image sensor (CIS), and quantizes and encodes the electrical signal thereby to generate digital data.

The image former 130 forms (prints) the image on a recording medium such as recording paper. The image former 130 includes, for example, an electrophotographic laser printer. The image former 130, for example, feeds recording paper from a paper feed tray 132 in FIG. 1, forms the image on a surface of the recording paper, and discharges the recording paper onto a paper discharge tray 134.

The display 140 displays various information. The display 140 includes, for example, a display device such as a liquid crystal display (LCD), an organic electro-luminescence (EL) display, or a micro LED display.

The operation acceptor 150 receives an operation from a user using the image forming apparatus 10. The operation acceptor 150 includes an input, device such as a touch sensor. An input may be detected by the touch sensor by a common detection method such as a resistive method, an infrared method, an inductive method, or a capacitive method. Note that the image forming apparatus 10 may have a touch panel including the display 140 and the operation acceptor 150 integrated into one unit.

The storage 160 stores therein various types of programs and various types of data necessary for operation of the image forming apparatus 10. The storage 160 includes, for example, a storage device such as a solid state drive (SSD), which is semiconductor memory, or a hard disk drive (HDD).

The storage 160 stores therein a web browser application 162 and a setting table 166. In the storage 160, a screen information storage area 164 is reserved as a storage area.

The web browser application 162 is software (display engine) that is used to display predetermined screens such as a home screen and an operation screen on the display 140. The home screen is a basic screen that is displayed, for example, when the power is turned on, when the apparatus is in standby mode, or when the apparatus wakes up from sleep mode. The home screen is used to allow the user to select a function (job) to be implemented by the image forming apparatus 10. The operation screen is used for setting and operation of a job to be executed.

In the screen information storage area 164, data (screen information) to be used to display screens (content), which are displayed on the display 140 through the web browser application 162, is stored. The screen information is associated with screens (for example, home screen and operation screens for various functions). The screen information includes data such as hyper text markup language (HTML) data, cascading style sheets (CSS) data, and image data.

A content creator who creates the screen information specifies in advance the following information as setting values for each text element (object to be displayed) in content. Among the setting values shown below, the unit for values indicating length and character size is, for example, pixel (px).

(1) Text Area Height and Text Area Width

The text area height is a value of the height of an area in which text (character string) of a text element is displayed (referred to below as "display area"). The text area width is a value of the width of the display area. In general, blank space (margin or padding) is left around text for display quality and readability. However, the text area width and the text area height described above are for specifying the width and the height of the area where the text is actually rendered, and do not include blank space (2) Specified Character Size (fsOriginal)

The specified character size is a value of the character size (font size) of text to lie displayed. In CSS, the character size is specified in the font-size property.

(3) Line Height

The line height is a value of the height reserved for displaying a single line of text. The line height, is also referred to as a line feed amount. The line height may be set to a fixed value or specified as, for example, "1.5 times the character size". In CSS, the line height is specified in the line-height property.

(4) Minimum Specifiable Character Size (fsSpecifiedReduceMin)

The minimum specifiable character size is a value of the minimum character size that can be set through an automatic reduction process. The automatic reduction process refers to a process of updating, in a case where text to be displayed based on the settings (1) to (3) described above extends beyond the display area, settings for the display style of the text (referred to below as "style information") to settings for rendering the text within the display area. The minimum specifiable character size may be set as a numerical value or as a percentage relative to the specified character size. Note that the minimum specifiable character size does not have to be specified (omittable). In a case where the minimum specifiable character size is not specified, a minimum system character size described below is applied as the minimum specifiable character size.

(5) Automatic Reduction Attribute

The automatic reduction attribute is information indicating whether or not to apply the automatic reduction process. According to the present embodiment, any of the following values is set as an attribute value of the automatic reduction attribute.

No automatic reduction: The automatic reduction process is not applied.

Single-line fixed area: The automatic reduction process is applied. Display of two or more lines is not permitted.

Multi-line area: The automatic reduction process is applied. Display of two or more lines is permitted.

For each text element in the content, the content creator may specify, depending on the text to be displayed, whether or not to apply the automatic reduction process and whether or not to permit a line break in the text to be displayed, using a setting value for the automatic reduction process.

The following is three main factors that cause a line break.

Line break due to a line break code described in text

Word wrap

The word wrap refers to a line break that is inserted based on a delimiter such as a space or a hyphen in text so that a portion of the text after the delimiter wraps onto the next line.

Forced line break (mid-word line break)

The forced line break refers to a line break that threes an alphabetical word such as an English word to break even without a delimiter in the word if the word has a character string that goes over the width of the display area (overflow portion) so that the overflow portion wraps onto the next line.

In a case where the content creator does not intend to permit any line break due to the factors listed above to display text in a single line in any circumstances (for example, in a case where the display area is not high enough), the content creator may specify "single-line fixed area" for the automatic reduction attribute of text of the text element.

The setting table 166 is a table that contains settings to be used in the automatic reduction process. In the setting table 166, for example, each setting item is associated with a setting value as shown in FIG. 3. The setting values contained in the setting table 166 are fixed values that are common throughout the content. According to the present embodiment, the following three setting values are contained in the setting table 166.

(1) Minimum System Character Size (fsSystemReduceMin)

The minimum system character size is a value of the smallest character size settable in the automatic reduction process (for example, "1.2 px"). In a case where the display engine itself defines a lower limit of specifiable character size, this value is used as the lower limit of the character size of the text. In a case where the content (the image forming apparatus 10) has a lower limit of character size, this value is defined as the minimum system character size. The minimum system character size is defined in advance in order to prevent the automatic reduction process from making the character size overly small.

(2) Minimum Width-Condensable Character Size (fsCondensedMin)

The minimum width-condensable character size is a value indicating a lower limit of character size for which width condensation is possible in the automatic reduction process (for example, "15px"). The width condensation refers to a process of making characters in text appear narrower and fit within the display area. The minimum width-condensable character size is defined in advance in order to prevent the readability of text in a small character size from being reduced as a result of the width condensation of the text.

(3) Minimum Width Condensation Ratio (fsCondensedRatioMin)

The minimum width condensation ratio is a value indicating a lower limit of width condensation ratio settable in the automatic reduction process (for example, 65%). The width condensation ratio is a ratio of condensation of the character width in the width condensation, and is a transformation factor to be set for the width (length in an X direction) of the text element for displaying the text element. In a case where text that needs a width of 100 px is transformed and rendered to a width of 70 px, for example, a value "70%" or "0.7 times" is set as the condensation ratio. In CSS, the width condensation ratio is specified as "transform:scaleX(width condensation ratio)". The minimum width condensation ratio is defined in advance in order to prevent the readability from being reduced due to the character width of text being overly condensed.

The communicator 190 communicates with an external device via a local area network (LAN) or a wide area network (WAN). The communicator 190 includes, for example, a communication module or a com communication device such as a network interface card (NIC) that is used in a wired/wireless LAN. The communicator 190 may alternatively communicate with another device via a telephone line. In this case, the communicator 190 includes an interface (terminal) configured to receive insertion of a cable for connecting to the telephone line, and transmits and receives images to and from another device through facsimile communication using a known protocol and a known standard such as the G3/G4 standards.

1.2. Flows of Processes

The following describes flows of processes to be performed by the image forming apparatus 10 according to the present embodiment with reference to FIGS. 4 to 9. The processes shown in FIGS. 4 to 9 are executed by the controller 100 that has read the programs stored in the storage 160.

1.2.1 Main Process

Figure 4:
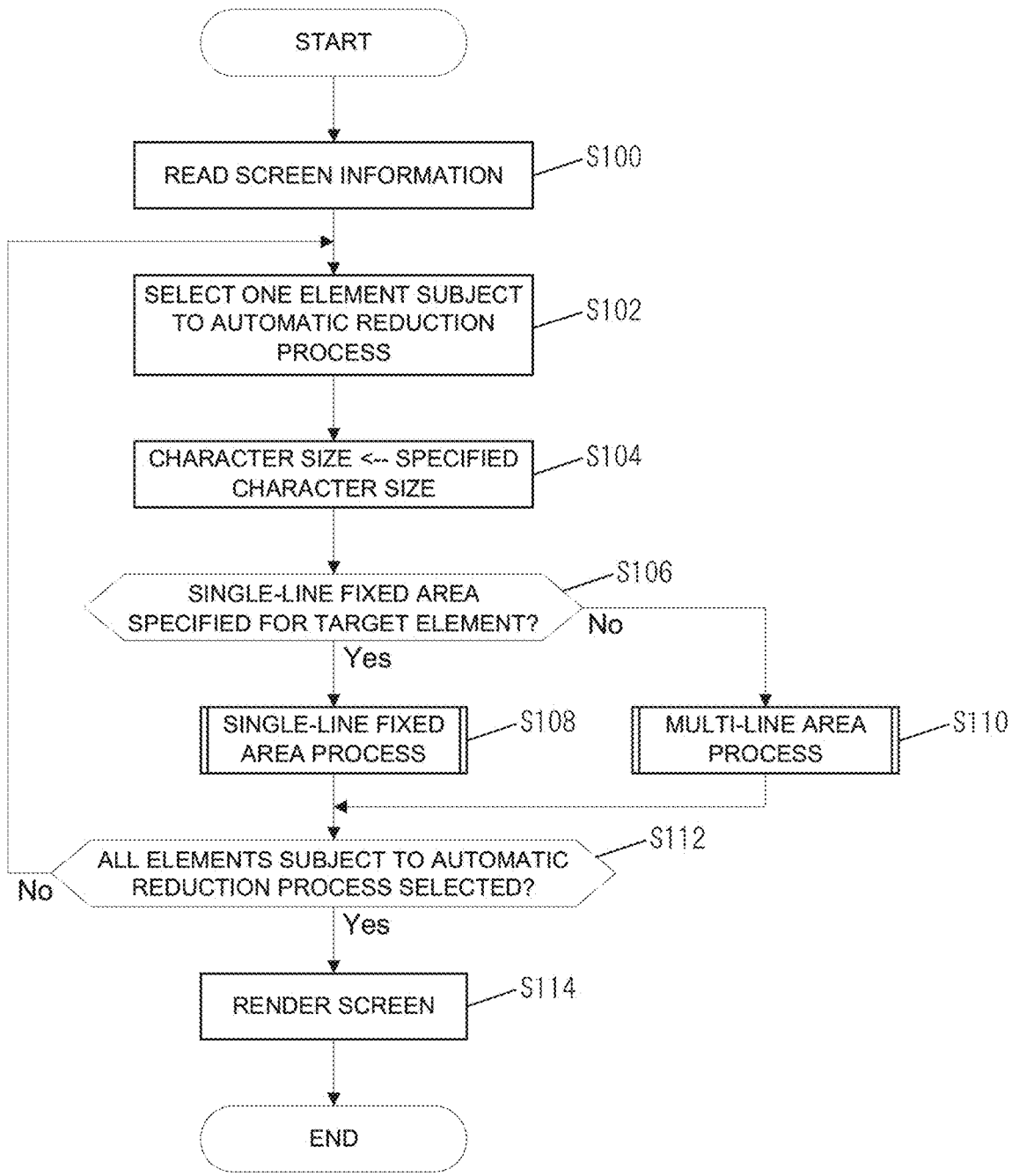
FIG. 4 is a flowchart showing a flow of a main process in the image forming apparatus according to the first embodiment.

The following describes a principal process (main process) to be performed by the image forming apparatus 10 with reference to FIG. 4. The process shown in FIG. 4 is executed when the controller 100 displays a screen on the display 140. Note that the controller 100 is able to read and execute the web browser application 162 in parallel with the main process, and cause the display engine to perform a predetermined display process. The following description uses an example in which an object for which the display size is set is a text element.

First, the controller 100 reads, out of the screen information storage area 164, the screen information of a screen to be displayed (Step S100). With respect to the thus read screen information, the controller 100 may configure settings necessary to display the object. For example, the controller 100 may set a line break control attribute for each text element, because the web browser allows specification of a method for controlling line breaks in text (line break control attribute). For example, in order to inhibit line breaks in a text element for which "single-line fixed area" is specified as the attribute value of the automatic reduction attribute, the controller 100 specifies "nowrap" in the whitespace property of the text element in CSS.

Subsequently, the controller 100 selects one text element subject to the automatic reduction process based on the read screen information (Step S102). For example, based on the screen information read in Step S100, the controller 100 selects a text element that is included in the screen to be displayed and for which "single-line fixed area" or "multi-line area" is specified as the attribute value of the automatic reduction attribute. In the following description, the text element selected in Step S102 is referred to as a "target element".

Subsequently, the controller 100 sets the character size of text of the target element to the specified character size (Step S104). For example, the controller 100 sets the specified character size in the font-size property of the target element. The controller 100 may set a line height in the line-height property of the target element. As described above, the controller 100 reflects the setting values specified by the content creator in the style information of the target element.

Subsequently, the controller 100 determines whether or not the single-line fixed area is specified for the target element (whether or not the automatic reduction attribute of the target element is "single-line fixed area") (Step S106). If the single-line fixed area is specified for the target element, the controller 100 executes a single-line fixed area process on the target element as the automatic reduction process (Yes in Step S106→Step S108). The single-line fixed area process refers to a process of changing the original style information, and thus overwriting (updating) the style information of the target element in order to display the text (one line of character string) of the target element in the display area. The single-line fixed area process is described below.

If the multi-line area is specified for the target element, the controller 100 performs a multi-line area process on the target element as the automatic reduction process (No in Step S106→Step S110). The multi-line area process refers to a process of changing the original style information, and thus overwriting (updating) the style information of the target element in order to display the text (a plurality of lines of character string) of the target element in the display area. The multi-line area process is described below.

Subsequently, the controller 100 determines whether or not all of text elements subject to the automatic reduction process have been selected (Step S112). If not all of the text elements subject to the automatic reduction process have been selected, the controller 100 returns to Step S102 (No in Step S112→Step S102).

As described above, the controller 100 updates the style information, such as the character size, the width condensation ratio, and a setting of whether or not to display text with an omission (ellipsis display attribute), for the target element by executing the automatic reduction process. For example, the controller 100 sets a width condensation ratio as a value of the scaling transformation property for a character string (in CSS, "transform:scaleX(width condensation ratio)").

If all of the elements subject to the automatic reduction process have been selected, the controller 100 executes a process of rendering, on the display 140, a screen based on the screen information read in Step S100 (actual screen rendering process) (Yes in Step S112→Step S114). Since the style information of the text elements has been overwritten in Step S108 and Step S110, the controller 100 can display a screen in which the overwritten style information has been reflected. Thus, the controller 100 can render each target element (object) within the display area using the display size of the target element (object) determined through the processes in Step S108 and Step S110.

As described above, for content including text elements subject to the automatic reduction process, the controller 100 executes the automatic reduction process on an element-by-element basis. The controller 100 updates the style information of all of the text elements requiring the automatic reduction process with sizes (character sizes and width condensation ratios) that allow the text to fit within the display areas for the text elements, and then executes the actual screen rendering process. As described above, the controller 100 can render text so that the text fits within the display area.

1.2.2 Single-Line Fixed Area Process

Figure 5:
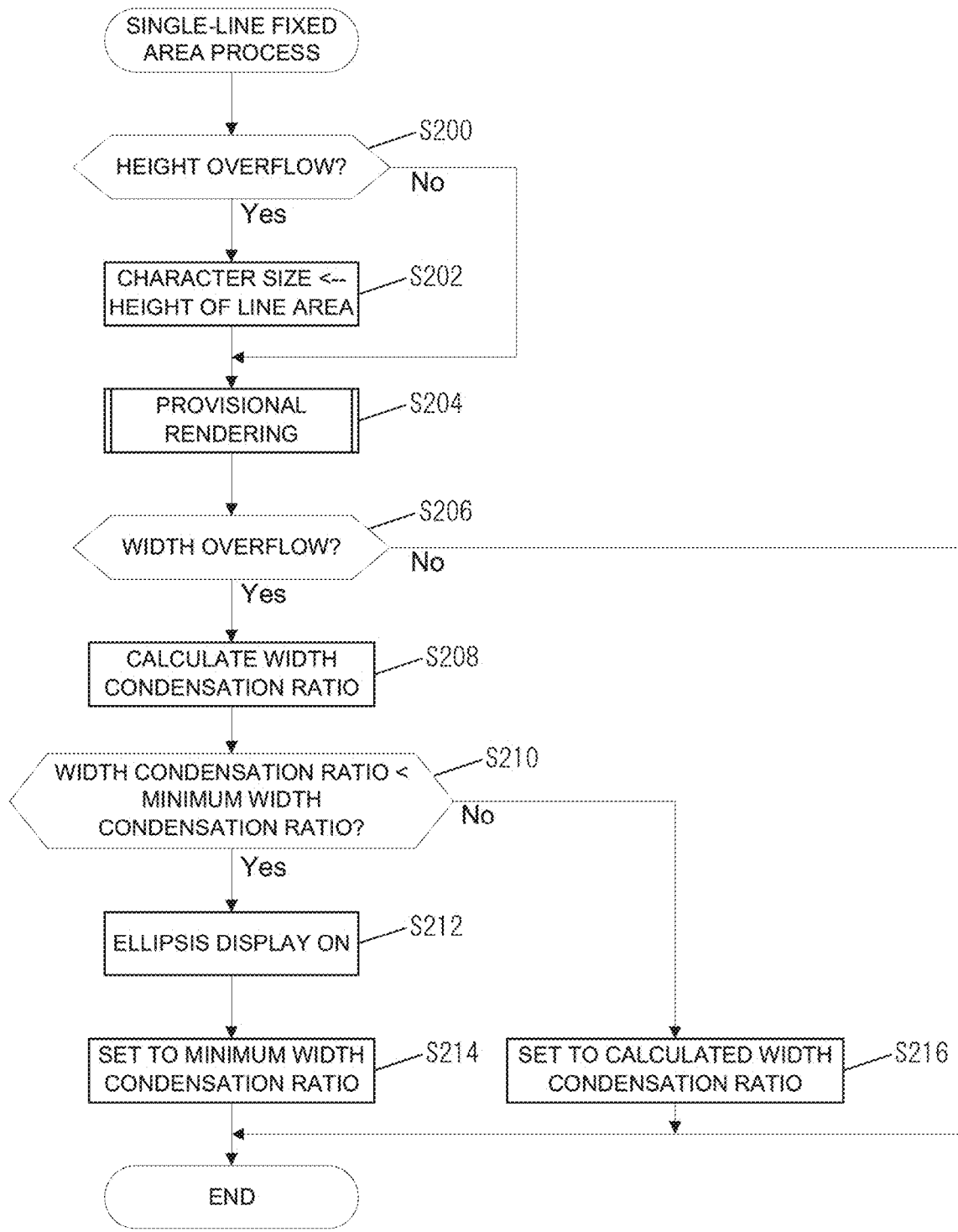
FIG. 5 is a flowchart showing a flow of a single-line fixed area process according to the first embodiment.

The following describes a flow of the single-line fixed area process with reference to FIG. 5. First, the controller 100 compares the size of the target element (object) with the size of the display area by comparing the specified character size of the target element with the height (height dimension) of the display area to determine whether or not the target element causes height overflow (Step S200). The height overflow means that the height of the text of the target element exceeds the height of the display area when the text is placed. In Step S200, the controller 100 may determine that the target element causes height overflow if the specified character size exceeds the height of the display area.

If the target element causes height overflow, the controller 100 sets the character size of the target element to a character size corresponding to the height of a line area (area in which one line of text is displayed) specified for the target element (Yes in Step S200→Step S202). Thus, the controller 100 changes (reduces) the character size of the text of the target element to a character size that has substantially the same height as the height of the display area. For example, the controller 100 sets the character size of the target element to a character size that allows the text to fit within the line area by taking into account the line height. Specifically, in a case where the height of the line area is 30 px and the line height is 1.2 times the character size, the controller 100 works out 30/1.2=25 (px) as the character size that allows the text to fit within the line area. If the target element does not cause height overflow, the controller 100 skips the process in Step S202 (No in Step S200). In this case, the character size of the target element remains at the specified character size.

Subsequently, the controller 100 performs provisional rendering (Step S204). The provisional rendering means to cause the display engine to actually perform the display process (placement) on the text of the target element without reflecting the process on the screen. That is, the provisional rendering is a process of provisionally placing the target element. For example, the controller 100 provisionally places the text by causing the display engine to place the text on the display area after setting a non-display attribute for the target element.

The controller 100 causes, for example, the web browser, which is the display engine, to actually render the target element. For this process, the controller 100 sets the visibility property of the text of the target element in CSS to "hidden". This allows the controller 100 to obtain the display condition of the target element without the text of the target element being displayed on the actual screen.

Note that the provisional rendering is not particularly limited as along as the display condition of the target element is obtained. The controller 100 may therefore place the text of the target element using, as a character color, the same color as the background color of the display area to obtain the display condition of the text. The controller 100 may also place the text, delete the text in a short time (for example, one frame after a frame in which the text is placed), and obtain the display condition at the time when the text is placed. This allows the controller 100 to display the text in a display manner that is not easily visible to the user and obtain the display condition of the text.

Subsequently, the controller 100 compares the size of the target element (object) with the size of the display area by obtaining display result information of the provisionally rendered text of the target element to determine whether or not the target element causes width overflow (Step S206). For example, the controller 100 obtains the height and the width of a bounding rectangle area of the text placed by the browser as the display result information of the text. Thus, the controller 100 can obtain the height and the width of an area (bounding rectangle area) over z which the text has been placed (referred to below as "placed text area"). The width overflow means that the width of the text of the target element exceeds the width of the display area when the text is placed. Note here that the controller 100 obtains the height and the width of the placed (rendered) text area as the display result information. The controller 100 then compares the width of the placed text area with the width of the display area, and determines that the target element causes width overflow if the width of the placed text area is greater than the width of the display area.

If the target element does not cause width overflow, the controller 100 ends the single-line fixed area process, because the text of the target element fits within the display area (No in Step S206). In this case, the style information of the target element is as follows: the character size is the specified character size or the character size set in Step S202, and the width condensation ratio is 100% (no width condensation). The text is displayed without any omission.

If the target element causes width overflow, the controller 100 calculates the width condensation ratio (Yes in Step S206→Step S208). For example, the controller 100 calculates the width condensation ratio by dividing the width of the display area by the width (text width) of the placed text area (width of display area/text width). By dividing the width of the display area by the text width, the controller 100 can set the width condensation ratio of the text of the target element to a width condensation ratio that allows the text to be displayed in substantially the same width as the display area. Note here that the processes executed in Step S202 and Step S208 allow the controller 100 to set the character size and the width condensation ratio so that ends of the text (top and bottom ends or left and right ends) are in contact with or in vicinity to corresponding ends of the display area. That is, the controller 100 can calculate a size (width condensation ratio) that allows the text to be displayed in the largest possible size within the display area and set the display size to the thus calculated size.

Subsequently, the controller 100 determines whether or not the width condensation ratio calculated in Step S208 is lower than the minimum width condensation ratio (Step S210). If the width condensation ratio is lower than the minimum width condensation ratio, the controller 100 sets the ellipsis display attribute to "display ON" and sets the value of the width condensation ratio of the text of the target element to the minimum width condensation ratio (Yes in Step S210→Step S212→Step S214). In this case, the style information of the target element is as follows: the character size is the specified character size or the character size set in Step S202, the width condensation ratio is the minimum width condensation ratio, and the ellipsis display attribute is "display ON". As described above, the controller 100 determines the display size of the target element (object) that allows the target element to be contained within the display area. Furthermore, the controller 100 changes the shape of characters to reduce the display width of the characters by setting the width condensation ratio to the minimum width condensation ratio, and uses the resultant shape-changed characters.

Note that the ellipsis display attribute indicates whether or not to render text by omitting a portion of the text. According to the present embodiment, the ellipsis display attribute being "display ON" indicates that the text is rendered by omitting a portion of the text, and other values of the ellipsis display attribute (for example, ellipsis display attribute being "display OFF" or unspecified) indicate that the text is rendered without any omission. That is, the ellipsis display attribute set to "display ON" for a text element indicates that only a portion of text of the text element and an ellipsis (for example, " . . . ") are displayed in the display area if the entirety of the text cannot be displayed in the display area. For example, in Step S212, the controller 100 sets the ellipsis display attribute to "display ON" by specifying "ellipsis" in text-overflow of the target element in CSS.

If the width condensation ratio is not lower than the minimum width condensation ratio, the controller 100 sets the value of the width condensation ratio for the text of the target element to the width condensation ratio calculated in Step S208 (No in Step S210→Step S216). In this case, the style information of the target element is as follows: the character size is the specified character size or the character size set in Step S202, and the width condensation ratio is the width condensation ratio calculated in Step S208. The text is displayed without any omission. As described above, the controller 100 determines a size that allows the text to be contained within the display area by changing the size (character size and width condensation ratio) of the text. As described above, the controller 100 determines the display size of the target element (object) that allows the target element to be contained within the display area. Furthermore, the controller 100 changes the shape of characters to reduce the display width of the characters by setting the width condensation ratio, and uses the resultant shape-changed characters.

1.2.3 Multi-Line Area Process

Figure 6:
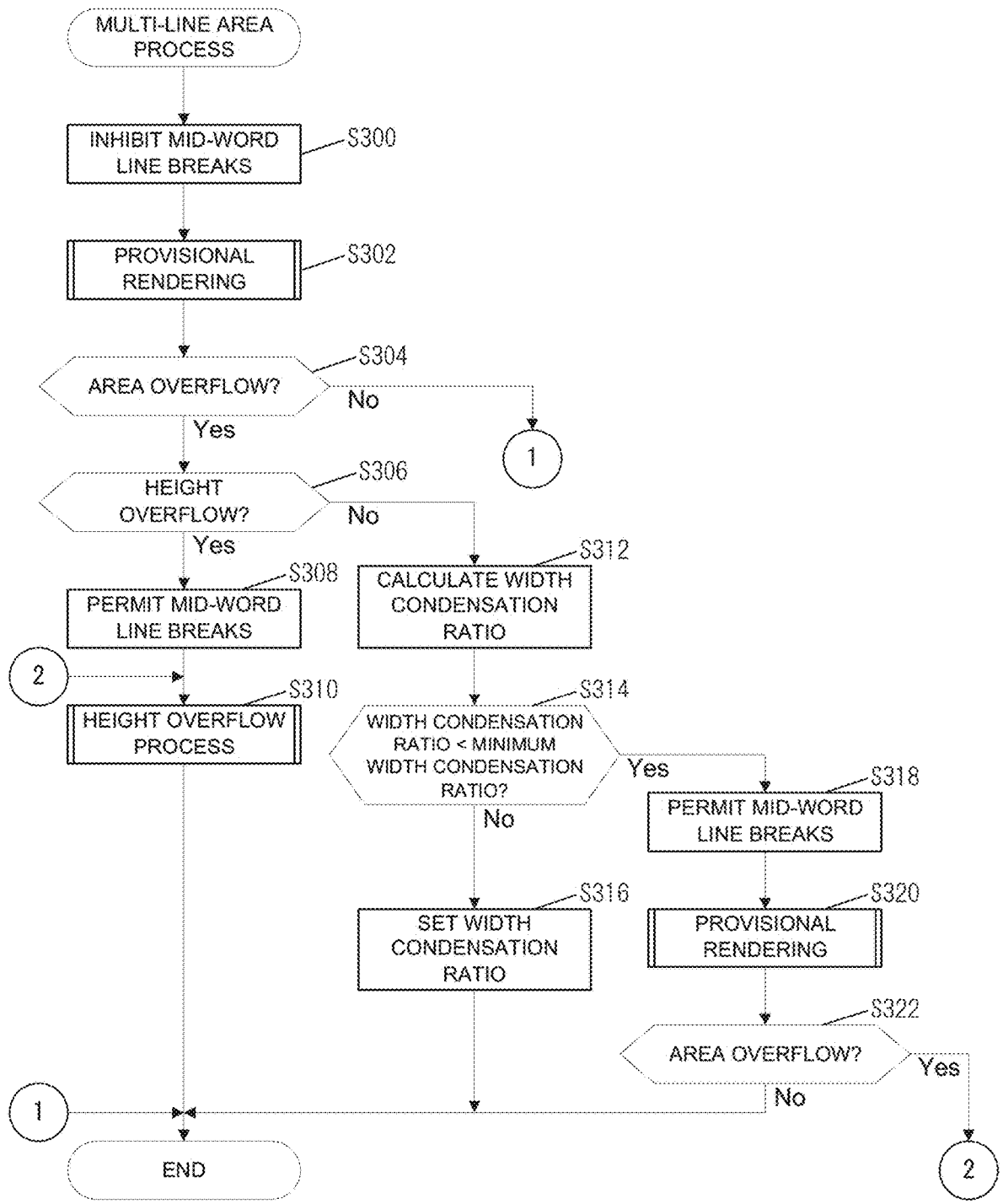
FIG. 6 is a flowchart showing a flow of a multi-line area process according to the first embodiment.

The following describes the multi-line area process with reference to FIG. 6. First, the controller 100 inhibits mid-word line breaks (Step S300). For example, the controller 100 sets the line break control attribute of the target element to "no mid-word line break". For example, "no mid-word line break" is set by specifying "normal" in the overflow-wrap property of the target element in CSS. As a result, in a situation in which the text of the target element includes a word that is longer than the width of the display area, the text is rendered while overflowing the display area in the provisional rendering.

Subsequently, the controller 100 performs the provisional rendering (Step S302) and compares the size of the target element (object) with the size of the display area by obtaining display result information of the text of the target element to determine whether or not the target element causes area overflow (Step S304). The area overflow means that the target element causes height overflow or width overflow.

The controller 100 compares the width of the placed text area with the width of the display area, and determines that the target element causes width overflow if the width of the placed text area is greater than the width of the display area. The controller 100 also compares the height of the placed text area with the height of the display area, and determines that the target element causes height overflow if the height of the placed text area is greater than the height of the display area. That is, the controller 100 compares the size (height and width) of the text element, which is the object to be displayed, with the size (height and width) of the display area. Through the comparisons, the controller 100 determines that the target element causes area overflow if the target element causes width overflow or height overflow.

If the target element does not cause area overflow, the controller 100 ends the multi-line area process, because the text of the target element fits within the display area (No in Step S304). In this case, the style information of the target element is as follows: the character size is the specified character size, and the width condensation ratio is 100% (no width condensation). The text is displayed without any omission.

If the target element causes area overflow, the controller 100 determines whether or not the target element causes height overflow (Yes in Step S304→Step S306). If the target element causes height overflow, the controller 100 performs a height overflow process by permitting mid-word line breaks, so that even if the text contains a word that is longer than the width of the display area, the word is broken based on the width of the display area (Yes in Step S306→Step S308→Step S310). For example, in Step S308, the controller 100 sets the line break control attribute of the target element to "permit mid-word line break". The "permit mid-word line break" is, for example, set by specifying "break-word" in the overflow-wrap property of the target element in CSS. As a result, the text of the target element is prevented from being placed beyond the width of the display area. The height overflow process refers to a process of changing the size (character size and width condensation ratio) of the text of the target element causing height overflow, and thus determining a size that allows the text to be contained within the display area. The height overflow process is described below.

If the target element does not cause height ovefflow, which in other words is if the target element only causes width overflow, the controller 100 calculates the width condensation ratio (No in Step S306→Step S312). For example, the controller 100 calculates the width condensation ratio by dividing the width of the display area by the width of the placed text area resulting from the provisional rendering.

Note here that mid-word line breaks are inhibited in Step S300. Accordingly, in a situation in which the text includes a word that is longer than the display area, the word is displayed while overflowing the display area. The height of the text is however within the display area. Specifically, the controller 100 determines whether or not only performing the width condensation allows the text to be displayed in the display area. That is, the controller 100 determines whether or not the width condensation ratio is lower than the minimum width condensation ratio (Step S314).

If the width condensation ratio is not lower than the minimum width condensation ratio, the controller 100 sets the width condensation ratio of the target element to the width condensation ratio calculated in Step S312 (No in Step S314→Step S316). In this case, the style information of the target element is as follows: the character size is the specified character size, and the width condensation ratio is the width condensation ratio calculated in Step S312. The text is displayed without any omission. As described above, the controller 100 changes the shape of characters to reduce the display width of the characters by setting the width condensation ratio, and uses the resultant shape-changed characters.

If the width condensation ratio is lower than the minimum width condensation ratio, the controller 100 permits mid-word line breaks and re-performs the provisional rendering (Yes in Step S314→Step S318→Step S320). Furthermore, the controller 100 obtains the display result information of the text of the target element and determines whether or not the target element causes area overflow (Step S322).

If the target element does not cause area overflow, the controller 100 ends the multi-line area process (No in Step S322). In this case, the style information of the target element is as follows: the character size is the specified character size and the width condensation ratio is 100% (no width condensation). The text is displayed without any omission. If the target element causes area overflow, the controller 100 performs the height overflow process (Yes in Step S322→Step S310).

As described above, if the target element does not cause height overflow, the controller 100 changes the size of the text (character size and width condensation ratio) through the width condensation, and thus determines a size that allows the text to be contained within the display area. The controller 100 also divides the width of the display area by the text width, so that ends of the text (top and bottom ends or left and right ends) are in contact with or in vicinity to corresponding ends of the display area.

1.2.4 Height Overflow Process

Figure 7:
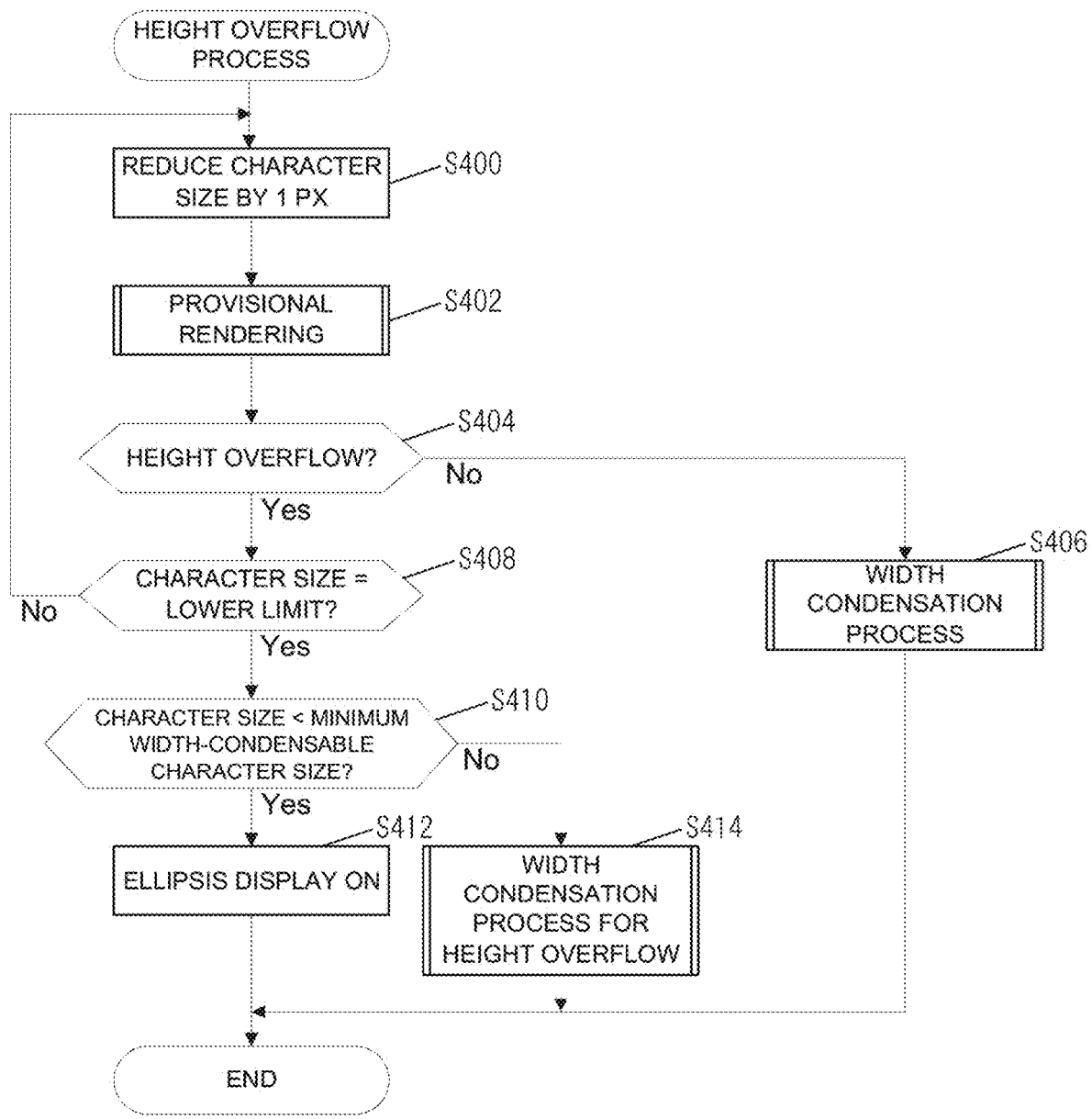
FIG. 7 is a flowchart showing a flow of a height overflow process according to the first embodiment.

The following describes the height overflow process with reference to FIG. 7. First, the controller 100 reduces the character size of the target element by 1 px (Step S400) and performs the provisional rendering (Step S402). The controller 100 compares again the size of the target element (object) with the size of the display area by obtaining the display result information of the text of the target element to determine whether or not the target element causes height overflow (Step S404).

If the target element does not cause height overflow, the controller 100 performs a width condensation process (No in Step S404→Step S406). The width condensation process is described below. Note that if the target element does not cause height overflow, the text of the target element can be displayed without any omission using a character size set for the target element (referred to below as "fitting character size (fsFit)"). As a result of the text being displayed using the fitting character size, the ends of the text are in contact with or in vicinity to the corresponding ends of the display area.

If the target element causes height overflow, the controller 100 determines whether the character size of the target element is equal to a settable character size lower limit (Yes in Step S404→Step S408). The settable character size lower limit is the minimum specifiable character size (fsSpecifiedReduceMin) of the target element (or the minimum system character size (fsSystemReduceMin) in a case where the minimum specifiable character size is not specified for the target element).

If the character size of the target element is not equal to the settable character size lower limit, the controller 100 returns to Step S400 (No in Step S408→Step S400). In this way, if the target element causes height overflow the controller 100 repeats the process of performing the provisional rendering by reducing the character size in increments of 1 px until the target element no longer causes height overflow or until the character size equals to the settable character size lower limit. As described above, the controller 100 determines the display size of the target element (text) that allows the text to be contained within the display area by changing (reducing) the character size of the target element.

If the character size of the target element is equal to the settable character size lower limit, this indicates that the text does not fit within the display area even with the minimum settable size. At this point, the character size of the target element is the minimum specifiable character size. The controller 100 therefore determines whether to display the text by setting the character size of the target element to the minimum specifiable character size and omitting a portion of the text, or to display the text within the display area by performing the width condensation. Specifically, the controller 100 determines whether or not the character size of the target element is smaller than the minimum width-condensable character size (fsCondensedMin) (Yes in Step S408→Step S410).

If the character size of the target element is smaller than the minimum width-condensable character size (fsCondensedMin), the controller 100 determines that the width condensation cannot be applied to the text of the target element, and then sets the ellipsis display attribute to "display ON" and ends the height overflow process (Yes in Step S410→Step S412). That is, since changing the size of the text does not allow the target element (object) to be contained within the display area, the controller 100 determines to render the character string by omitting a portion of the target element. In this case, the style information of the target element is as follows: the character size is the minimum specifiable character size, the width condensation ratio is 100% (no width condensation), and the ellipsis display attribute is "display ON".

If the character size of the target element is larger than or equal to the minimum width-condensable character size (fsCondensedMin), the width condensation can be applied to the current character size (minimum specifiable character size) of the target element, and thus the controller 100 determines to perform the width condensation on the target element in the current character size. The controller 100 then performs a width condensation process for height overflow (Step S414). The width condensation process for height overflow is described below.

1.2.5 Width Condensation Process

Figure 8:
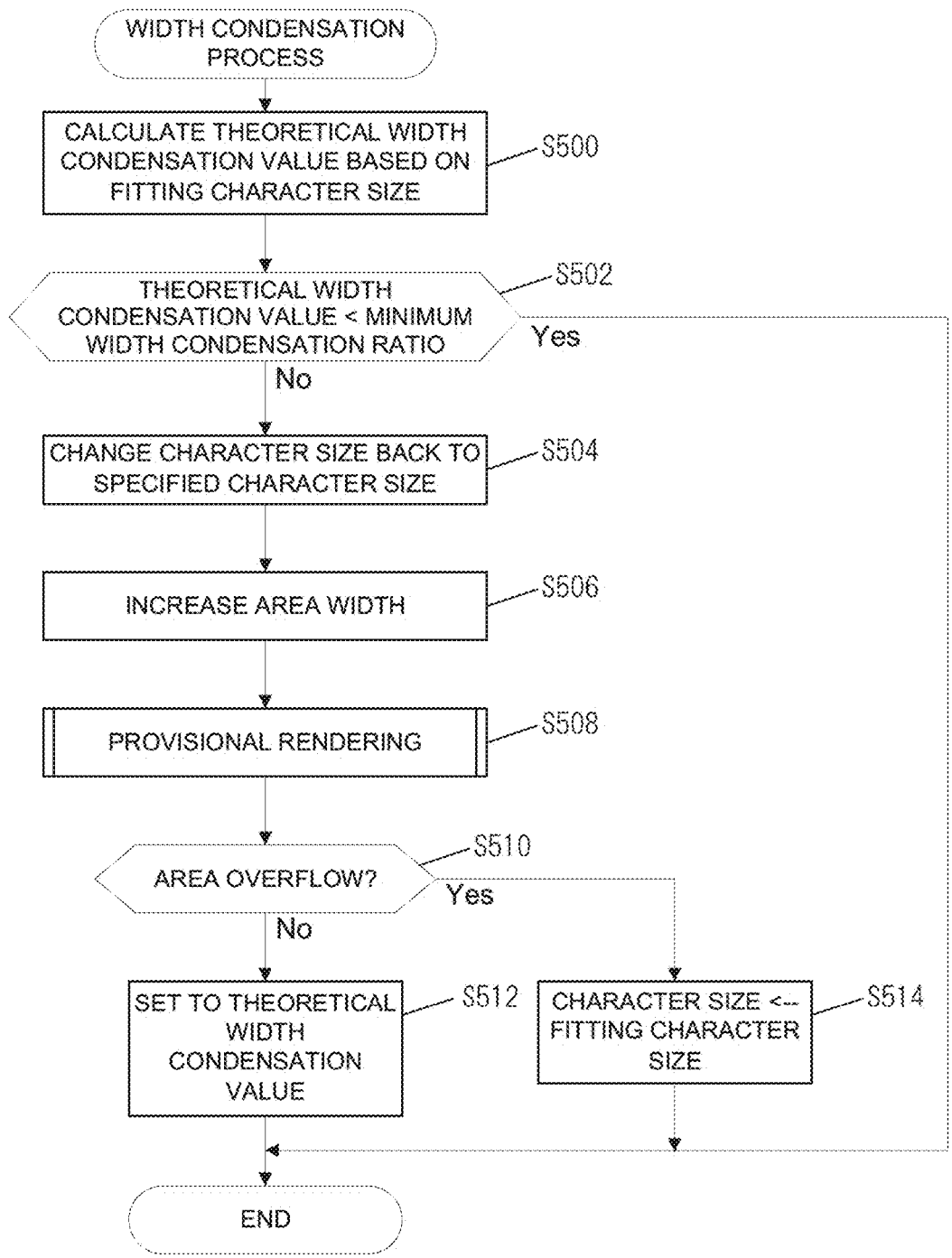
FIG. 8 is a flowchart showing a flow of a width condensation process according to the first embodiment.

The following describes the width condensation process with reference to FIG. 8. The width condensation process refers to a process of performing a width condensation determination process and setting appropriate style information.

The width condensation determination process refers to a process of determining, based on the fitting character size (fsFit), whether or not performing the width condensation is likely to allow the text of the target element to fit within the display area using the specified character size as is. Reducing the character size set for the target element resolves height overflow. Height overflow is resolved because one or both of the following cases (A) and (B) apply to the target element.
- (A) The height of each line is reduced. Consequently, the height of the placed text area fits within the height of the display area.
- (B) The character width is reduced as a result of the character size being reduced, increasing the number of characters that can be displayed per line. Consequently, the number of lines necessary for displaying the text is reduced, and the height of the placed text area fits within the height of the display area.

As long as height overflow is resolved because of (B), reducing the character width is enough to reduce the number of lines, and it is not necessary to reduce the character height (character size). The controller 100 therefore determines whether or not the case (B) applies to the target element (width condensation determination process). Note that the width condensation determination process corresponds to processes in Step S504 to Step S510 described below. If the case (B) applies, the controller 100 sets an appropriate width condensation ratio for the target element and sets the character size of the target element to the specified character size.

First, the controller 100 calculates the width condensation ratio based on the fitting character size (Step S500). For example, the controller 100 calculates the width condensation ratio by dividing the fitting character size (fsFit) by the specified character size (fsOriginal). The thus calculated width condensation ratio is referred to as a theoretical width condensation value (calcedCondensed).

Subsequently, the controller 100 determines whether or not the theoretical width condensation value (calcedCondensed) is lower than the minimum width condensation ratio (fsCondensedRatioMin) (calcedCondensed<fsCondensedRatioMin) (Step S502). If the theoretical width condensation value is lower than the minimum width condensation ratio, the controller 100 does not perform the width condensation, and specifies the fitting character size (fsFit) as the character size of the target element and ends the width condensation determination process (Yes in Step S502). In this case, the style information of the target element is as follows: the character size is the fitting character size, and the width condensation ratio is 100% (no width condensation). The text is displayed without any omission.

If the theoretical width condensation value is not lower than the minimum width condensation ratio (No in Step S502), the controller 100 determines whether or not performing the width condensation allows the text to fit within the display area (width condensation determination process). The controller 100 changes the character size of the target element back to the specified character size (Step S504). The controller 100 also increases the area width of the display area (Step S506).

Note here that the width condensation of the target element is implemented by performing an image transformation process in the X direction on the target element displayed in a normal state. The controller 100 therefore implements the width condensation by causing the display engine (web browser) to perform a line break process on the pre-width condensation target element, and then performing width condensation transformation on the target element resulting from the line break process. The line break position after the width condensation appears in the provisionally rendered text as a result of the provisional rendering being performed by extending the display area. That is, the controller 100 temporarily increases the area width of the display area to a width obtained by multiplying the area width of the display area by the reciprocal of the theoretical width condensation value (1/calcedCondensed), and provisionally renders the text on the resultant display area using the specified character size. This allows the controller 100 to perform the provisional rendering of the text using the post-width condensation line break position and the post-width condensation line number. Thus, in Step S506, the controller 100 increases the width of the display area for the text of the target element by multiplying the width of the display area by the reciprocal of the theoretical width condensation value. Furthermore, the controller 100 performs the provisional rendering of the text on the display area having the thus increased area width (Step S508).

Subsequently, the controller 100 compares the size of the target element (object) with the size of the display area by obtaining display result information to determine whether or not the target element causes area overflow (Step S510). If the target element does not cause area overflow, the controller 100 sets the width condensation ratio of the target element to the width condensation ratio (theoretical width condensation value) calculated in Step S500, because the text of the target element fits within the display area (No in Step S510→Step S512). In this case, the style information of the target element is as follows: the character size is the specified character size, and the width condensation ratio is the theoretical width condensation value. The text is displayed without any omission. That is, for the text of the target element, the specified character size is kept set as the character size, and the width condensation ratio (theoretical width condensation value) is set using the specified character size so that the target element fits within the display area.

As described above, the controller 100 performs the width condensation if the controller 100 determines through the width condensation determination process that the text permitted to be displayed in multiple lines (multi-line character string) fits within the display area as a result of reducing the character size specified for the text (specified character size). Note here that the controller 100 sets, as the width condensation ratio, the condensation ratio of the width (theoretical width condensation value) of the specified character size to a ratio between the specified character size and the reduced character size (fitting character size). As long as the theoretical width condensation value allows the text to be displayed within the display area, the controller 100 can determine the size (width condensation ratio) of the text so as to allow the text to fit within the display area using the specified character size as is.

If the target element causes area overflow, performing the width condensation does not allow the text of the target element to fit within the display area, and thus the controller 100 does not perform the width condensation and sets the character size of the text of the target element to the fitting character size (Yes in Step S510→Step S514). In this case, the style information of the target element is as follows: the character size is the fitting character size, and the width condensation ratio is 100% (no width condensation). The text is displayed without any omission.

1.2.6 Width Condensation Process for Height Overflow

Figure 9:
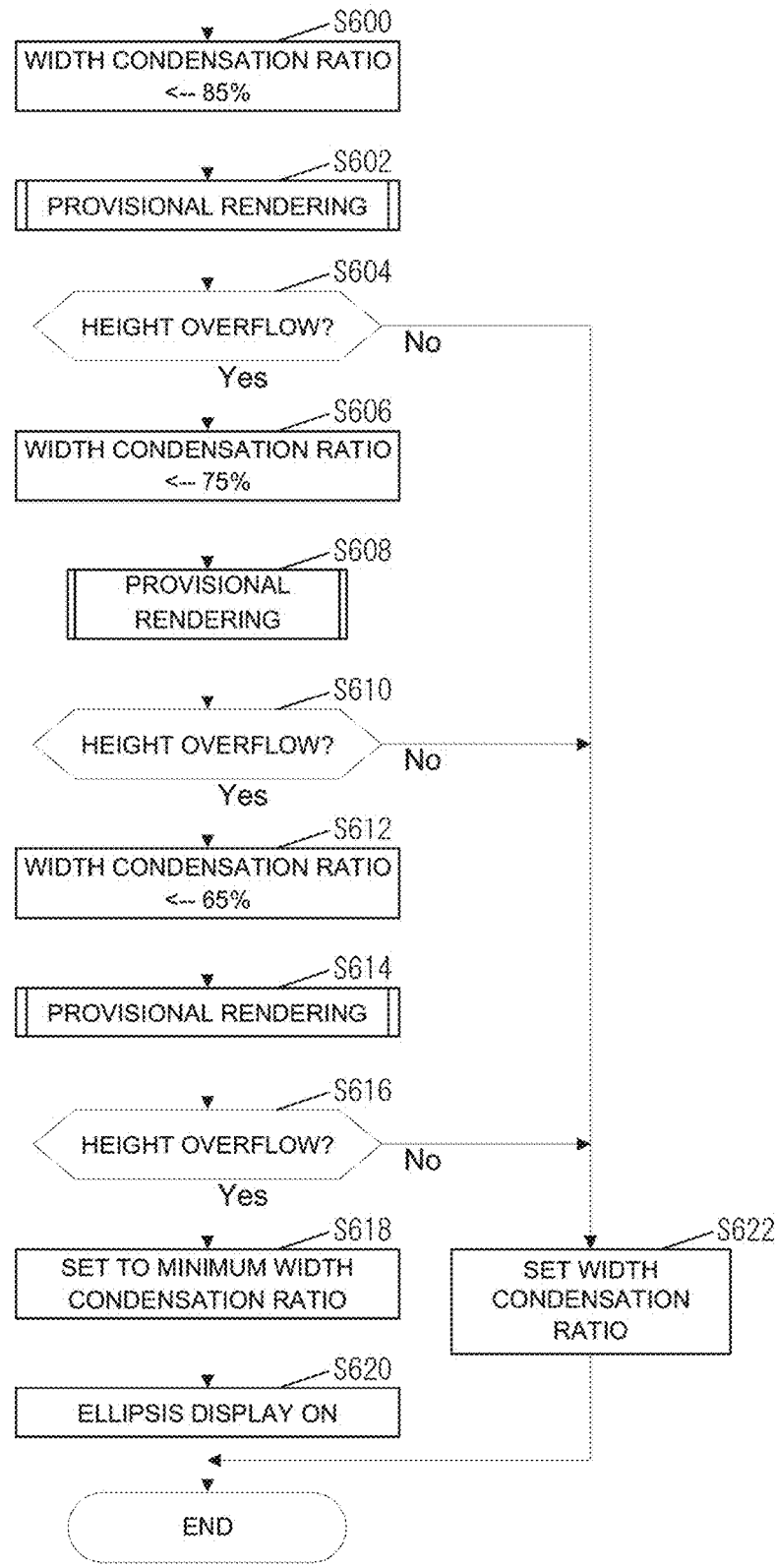
FIG. 9 is a flowchart showing a flow of a width condensation process for height overflow according to the first embodiment.

The following describes the width condensation process for height overflow with reference to FIG. 9. The width condensation process for height overflow refers to a process of determining the width condensation ratio by setting the target element to three preset width condensation ratios (85%, 75%, and 65%) in sequence and determining whether or not the target element fits within the display area. The controller 100 determines whether or not performing the width condensation allows the target element to fit within the display area by the same method as in the width condensation determination process described with reference to FIG. 8. That is, the controller 100 temporarily sets the width of the display area to a value obtained by multiplying the width by the reciprocal of the theoretical width condensation value, performs the provisional rendering, and determines whether or not performing the width condensation allows the target element to fit within the display area based on whether or not the text of the target element causes area overflow.

First, the controller 100 increases the area width of the display area to a width corresponding to a width condensation ratio of 85% and performs the provisional rendering (Step S600→Step S602). The controller 100 determines whether or not the target element causes height overflow by comparing the size of the target element (object) with the size of the display area (Step S604). If the target element does not cause height overflow, the controller 100 sets the width condensation ratio of the target element to 85% (No in Step S604→Step S622). In this case, the style information of the target element is as follows: the character size is the minimum specifiable character size, and the width condensation ratio is 85%. The text is displayed without any omission.

If the target element causes height overflow, the controller 100 increases the area width of the display area to a width corresponding to a width condensation ratio of 75% (Yes in Step S604→Step S606), performs the provisional rendering (Step S608), and determines whether or not the target element causes height overflow (Step S610). If the target element does not cause height overflow, the controller 100 sets the width condensation ratio of the target element to 75% (No in Step S610→Step S622). In this case, the style information of the target element is as follows: the character size is the minimum specifiable character size, and the width condensation ratio is 75%. The text is displayed without any omission.

If the target element causes height overflow, the controller 100 increases the area width of the display area to a width corresponding to a width condensation ratio of 65% (Yes in Step S610→Step S612), performs the provisional rendering (Step S614), and determines whether or not the target element causes height overflow (Step S616). If the target element does not cause height overflow, the controller 100 sets the width condensation ratio of the target element to 65% (No in Step S616→Step S622). In this case, the style information of the target element is as follows: the character size is the minimum specifiable character size, and the width condensation ratio is 65%. The text is displayed without any omission.

If the target element causes height overflow, the controller 100 sets the width condensation ratio of the target element to a lower limit value of the condensation ratio (65% in FIG. 9) (Yes in Step S616→Step S618). The controller 100 also sets the ellipsis display attribute of the target element to "display ON" (Step S620). In this case, the style information of the target element is as follows: the character size is the minimum specifiable character size, and the width condensation ratio is 65%. The text is displayed with an omission.

1.3 Operation Examples

The following describes operation examples of the present embodiment with reference to the drawings. In the operation examples, the following settings are configured for text elements.
Font: Noto Sans
Minimum system character size: 12 px
Minimum specifiable character size: 12 px, the same as the minimum system character size unless otherwise specified
Minimum width condensation ratio: 65%
Minimum width-condensable character size: 15 px
Display area (single-line fixed area): 100 px in width, 30 px in height
Display area (multi-line area): 100 px in width, 48 px in height
Line height: 1.2 times the specified character size
Line break control: Line break at a word break (white space) Forced line break at a character in a word that goes over the display area.

FIGS. 10A to 13C are diagrams showing operation examples with respect to text elements for which the single-line fixed area is specified as the automatic reduction attribute. FIGS. 14A to 22E are diagrams showing operation examples with respect to text elements for which the multi-line area is specified as the automatic reduction attribute. In FIGS. 10A to 22E, each solid line rectangular area indicates a display area.

Figure 10A:
FIGS. 10A to 10C are diagrams illustrating an operation example according to the first embodiment.
Figure 10B:
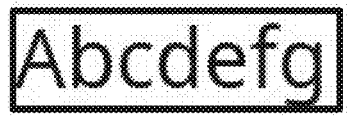
Figure 10C:
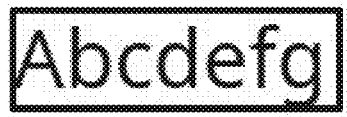

FIGS. 10A to 10C are diagrams showing an operation example in which the text element causes height overflow, the character size is set accordingly, and the text element does not cause width overflow in the provisional rendering performed thereafter. Text of the text element shown in FIGS. 10A to 10C is "Abcdefg", and the specified character size thereof is 30 px.

FIG. 10A shows a rendering example in which the text is provisionally rendered on the display area using the specified character size. As shown in FIG. 10A, the height of the text displayed using the specified character size is greater than the height of the display area, causing height overflow.

In this case, the character size of the text element is overwritten with (changed to) 25 px (=30 px/1.2), which is a character size corresponding to the height of the display area. FIG. 10B is a diagram showing the text provisionally rendered using the changed character size. The text rendered fits within the display area. Based on this provisional rendering result, attributes such as a character size of 25 px and a width condensation ratio of 100% (no width condensation) are set for the text element. FIG. 10C is a diagram showing the text that is finally displayed on the display screen as a result of the actual screen rendering process being performed (referred to below as "final display"). As shown in FIG. 10C, the text displayed fits within the display area. The text is displayed without any omission.

Figures 11A, 11B:
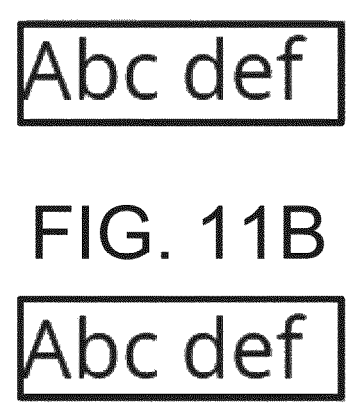

FIGS. 11A and 11B are diagrams showing an operation example in which the text element does not cause width overflow. Text of the text element shown in FIGS. 11A and 11B is "Abc def", and the specified character size thereof is 25 px.

FIG. 11A is a diagram showing the text provisionally rendered on the display area. As shown in FIG. 11A, the text does not extend beyond the area width of the display area (does not cause width overflow). Therefore, it is not necessary to perform the width condensation of the text. Based on this provisional rendering result, attributes such as a character size of 25 px and a width condensation ratio of 100% (no width condensation) are set for the text element. FIG. 11B is a diagram showing the final display of the text element. As shown in FIG. 11B, the text is displayed using the specified character size as is.

Figure 12A:
FIGS. 12A and 12B are diagrams illustrating an operation example according to the first embodiment.
Figure 12B:
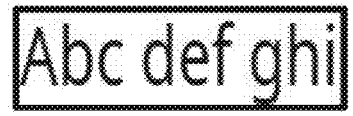

FIGS. 12A and 12B are diagrams showing an operation example in which the text element causes width overflow. Text of the text element shown in FIGS. 12A and 12B is "Abc def ghi", and the specified character size thereof is 25 px.

FIG. 12A is a diagram showing the text provisionally rendered on the display area. In this example, the text with is 132 px, which is greater than the width of the display area, 100 px, causing width overflow. In this case, the width condensation ratio is calculated to be 0.75 (75%), which is a value obtained by dividing the width of the display area, 100 px, by the text width, 132 px.

Based on this provisional rendering result, attributes such as a character size of 25 px and a width condensation ratio of 75% are set for the text element. FIG. 12B is a diagram showing the final display of the text element. As shown in FIG. 12B, the text is displayed in the display area using characters condensed at a width condensation ratio of 75% so as to fit within the original area width (100 px). The text is displayed without any omission.

FIGS. 13A to 13C show another operation example in which the text element causes width overflow. Text of the text element shown in FIGS. 13A to 13C is "Abe def ghi jklm", and the specified character size thereof is 25 px.

FIG. 13A is a diagram showing the text provisionally rendered on the display area. In this example, the text with is 188 px, which is greater than the width of the display area, 100 px, causing width overflow. In this case, the width condensation ratio is calculated to be 0.53 (53%), which is a value obtained by dividing the width of the display area, 100 px, by the text width, 188 px.

The thus calculated width condensation ratio, 53%, is lower than the minimum width condensation ratio, 65%. Therefore, the minimum width condensation ratio, 65%, is used as the width condensation of the text element. Based on this provisional rendering result, attributes such as a character size of 25 px, a width condensation ratio of 65%, and an ellipsis display attribute of "display ON" are set for the text element.

Note that an ellipsis is not displayed appropriately in some cases where the ellipsis display attribute is "display ON" even if "ellipsis" is specified in text-overflow of the target element in CSS. Examples of such cases include a case where the web browser does not support a function of displaying an ellipsis for a plurality of lines of text. In such a case, to respond to the ellipsis display attribute set to "display ON", the image forming apparatus 10 may process the text to be displayed by removing some characters at the end of the display area for a length necessary to display an ellipsis for example, " . . . ") and replacing the removed characters with the ellipsis, and then display the processed text.

In this operation example, the minimum width condensation ratio is 0.65 (the reciprocal thereof is 1.53). Accordingly, as shown in FIG. 13B, the width of the display area is increased to 153 px (100 px×1.53). The image forming apparatus 10 also provisionally renders the text on the extended display area, and thus obtains a maximum length of text (a portion of the text) that can be displayed together with the ellipsis and determines text to be displayed. For example, the image forming apparatus 10 determines text to be displayed as "Abc def ghi . . . ".

FIG. 13C is a diagram showing the final display of the text element. As shown in FIG. 13C, the text is omitted in part and displayed together with the ellipsis so as to fit within the original display area.

Figure 14A:
FIGS. 14A and 14B are diagrams illustrating an operation example according to the first embodiment.
Figure 14B:
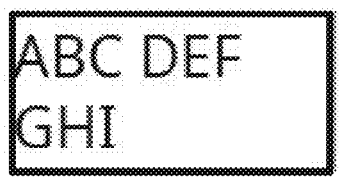

FIGS. 14A and 14B are diagrams showing an operation example in which the text element does not cause area overflow. Text of the text element shown in FIGS. 14A and 14B is "ABC DEF GHI", and the specified character size thereof is 18 px.

FIG. 14A is a diagram showing a provisional rendering result obtained when the text is provisionally rendered on the display area using the specified character size. The text does not extend beyond the display area (does not cause area overflow). Based on this provisional rendering result, attributes such as a character size of 18 px, which is the specified character size, and a width condensation ratio of 100% (no width condensation) are set for the text element. FIG. 14B is a diagram showing the final display of the text element. As shown in FIG. 14B, the text displayed fits within the display area.

Figure 15A:
FIGS. 15A to 15C are diagrams illustrating an operation example according to the first embodiment.
Figure 15B:
Figure 15C:

FIGS. 15A to 15C are diagrams showing an operation example in which text includes a word that is longer than the width of the display area, and performing the width condensation allows the text to fit within the display area. Text of the text element shown in FIGS. 15A to 15C is "ABCDEFGHIJKL MNO", and the specified character size thereof is 18 px.

FIG. 15A is a diagram showing the text provisionally rendered on the display area (provisional rendering result). As shown in FIG. 15A, the text includes a word that is longer than the width of the display area, and the provisional rendering result has width overflow. In this example, the width of the display area is 100 px, and the width of the placed text area is 126 px, which is greater than the width of the display area. In this case, the theoretical width condensation value is calculated to be 0.79 (79%), which is a value obtained by dividing the width of the display area, 100 px, by the text width, 126 px.

Based on this provisional rendering result, attributes such as a character size of 18 px and a width condensation ratio set to the theoretical width condensation value (79%) are set for the text element. FIG. 15B is a diagram showing the final display of the text element. As shown in FIG. 15B, the text displayed fits within the display area, with characters condensed at a width condensation ratio of 79%.

Note that in some general cases where mid-word line breaks are permitted, a long word included in text is displayed with a line break therein as shown in FIG. 15C. However, considering the readability, FIG. 15B in which the word is not broken is obviously preferable. The image forming apparatus 10 according to the present embodiment can achieve the display manner shown FIG. 15B by setting the line break control attribute of the text to "no mid-word line break".

Figure 16A:
FIGS. 16A to 16C are diagrams illustrating an operation example according to the first embodiment.
Figure 16B:
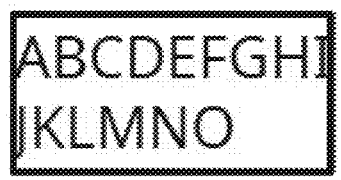
Figure 16C:

FIGS. 16A to 16C are diagrams showing an operation example in which text includes a word that is longer than the width of the display area, performing the width condensation does not allow the text to fit within the display area, and inserting a forced line break in the word allows the text to fit within the display area. Text of the text element shown in FIGS. 16A to 16C is "ABCDEFGHIJKLMNO", and the specified character size thereof is 18 px.

FIG. 16A shows a provisional rendering result obtained using the specified character size. As shown in FIG. 16A, the text includes a word that is longer than the width of the display area, and the provisional rendering result has width overflow. In this example, the width of the display area is 100 px, and the width of the placed text area obtained based on the provisional rendering result is 171 px, which is greater than the width of the display area. Then, the theoretical width condensation value is calculated to be 0.58 (=100/171). The theoretical width condensation value calculated to be 0.58 is lower than the minimum width condensation ratio (65%). In this case, the width condensation is not performed.

In this case, the provisional rendering is re-performed with a mid-word line break permitted. FIG. 16B is a diagram showing the provisional rendering result. As shown in FIG. 16B, the placed text area is within the display area in terms of both height and width. Consequently, the final display of the text element is as shown in FIG. 16B.

Note that FIG. 16C is a diagram showing an example of text displayed by applying the width condensation, with priority given to ng a mid-word line break. In a case where each character of a long character string such as a phone number, an e-mail address, or a uniform resource locator (URL) needs to be clearly exhibited, for example, the display manner shown in FIG. 16B is obviously more preferable than the display manner shown in FIG. 16C. The present embodiment achieves the display manner shown in FIG. 16B by permitting a mid-word line break in the text and rendering the text using the specified character size.

FIGS. 17A to 17E are diagrams showing an operation example in which text includes a word that is longer than the width of the display area, and inserting a forced line break in the word results in height overflow. Text of the text element shown in FIGS. 17A to 17E is "ABCDEFGHIJKLMNO PQRS", and the specified character size thereof is 18 px.

Figure 17A:
FIGS. 17A to 17E are diagrams illustrating an operation example according to the first embodiment.

FIG. 17A shows a provisional rendering result, indicating width overflow. In this case, the width condensation ratios is calculated to determine whether or not the width condensation is possible. In this example, the width of the display area is 100 px, and the width of the placed text area obtained based on the provisional rendering result is 171 px, which is greater than the width of the display area. Then, the theoretical width condensation value is calculated to be 0.58 (=1.00/1.71). The theoretical width condensation value calculated to be 0.58 is lower than the minimum width condensation ratio (65%), and therefore the width condensation is not performed.

Figure 17B:
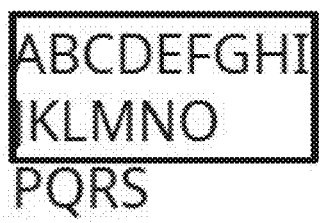
Figure 17C:
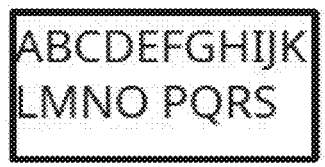

FIG. 17B is a diagram showing a provisional rendering result obtained using the specified character size with a mid-word line break permitted. As shown in FIG. 17B, the text is displayed in three lines, resulting in height overflow. In this case, the character size of the text is reduced by 1 px, and then the provisional rendering is performed. This process is repeated to reduce the character size of the text from 1.7 px to 16 px to 1.5 px. In this example, the text fits within the display area as shown in FIG. 17C as a result of the character size being reduced to 15 px. In this case, the fitting character size is 15 px. Based on the fitting character size, the condensation ratio is calculated to be 0.83 (=15/18).

Figure 17D:
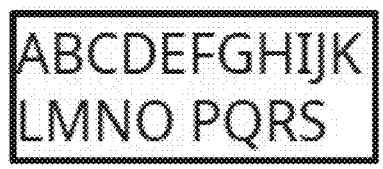
Figure 17E:
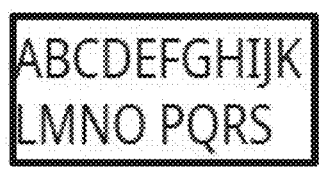

Next, the image forming apparatus 10 determines whether or not performing the width condensation allows the text to fit within the display area. FIG. 17D is a diagram showing the text provisionally rendered on the display area using the specified character size after the width of the display area has been increased to 120 px, which is a width obtained by multiplying the area width (100 px) of the display area by the reciprocal (1.20) of the theoretical width condensation value. The provisional rendering result indicates that the text fits within the display area. The text is therefore rendered at a width condensation ratio of 83% so that the increased area width of the display area returns to the original area width (100 px). FIG. 17E is a diagram showing the final display of the text element.

FIGS. 18A to 18D are diagrams showing an operation example in which the text, element causes height overflow, and the width condensation is performed by replacing the reduction ratio of the character size with the width condensation ratio, so that the text fits within the display area. Text of the text element shown in FIGS. 18A to 18D is "ABC EFGHIJK LMNO", and the specified character size thereof is 18 px.

Figure 18A:
FIGS. 18A to 18D are diagrams illustrating an operation example according to the first embodiment.
Figure 18B:
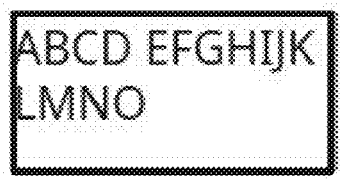

FIG. 18A shows a provisional rendering result obtained using the specified character size. As shown in FIG. 18A, the text element causes height overflow as a result of the text being provisionally rendered using the specified character size. In this case, the character size of the text is reduced by 1 px, and then the provisional rendering is performed. This process is repeated to reduce the character size of the text from 17 px to 16 px to 15 px to 14 px. In this example, the text fits within the display area as shown in FIG. 18B as a result of the character size being reduced to 14 px. In this case, the fitting character size is 14 px. Based on the fitting character size, the condensation ratio is calculated to be 0.78 (=14/18). Note that it is a conventional technique to reduce the character size and use a character size that allows the text to fit within the display area as a character size for displaying the text. The use of such a conventional technique results in text displayed as shown in FIG. 18B.

Figure 18C:

Next, the condensation ratio is calculated based on the fitting character size. The condensation ratio is 0.778 (=14/18). Next, the character size is changed hack to 18 px as originally specified, and the provisional rendering is performed using a width condensation ratio of 0.78, which is the calculated condensation ratio. Specifically, the area width of the display area is temporarily set to a value obtained by multiplying the area width of the display area by the reciprocal of the condensation ratio (1/0.778, 1.29 times) so that the display area changes to the original or narrower width upon the width condensation, and the provisional rendering is performed. FIG. 18C is a diagram showing the provisional rendering result. As shown in FIG. 18C, the text displayed fits within the display area.

Figure 18D:

In this case, an additional width condensation ratio is set for the text element to display the text using the original width. For example, a setting "transform:scaleX(0.778)" is added for the target element in CSS. FIG. 18D is a diagram showing the final display of the text element. The text is displayed using larger characters in FIG. 18D than in FIG. 18B, which shows the text displayed according to the conventional method.

Figure 19A:
FIGS. 19A to 19C are diagrams illustrating an operation example according to the first embodiment.
Figure 19B:
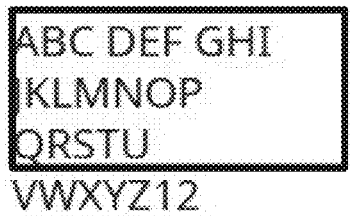
Figure 19C:
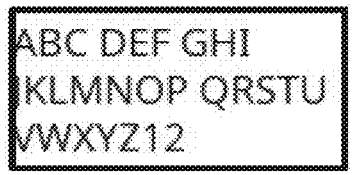

FIGS. 19A to 19C are diagrams showing an operation example in which reducing the character size allows text to fit within the display area. Text of the text element shown in FIGS. 19A to 19C is "ABC DEF GHI JKLMNOP QRSTU VWXYZ12". The specified character size thereof is 20 px, and the minimum specifiable character size thereof is 12 px.

FIG. 19A shows a provisional rendering result obtained using the specified character size. As shown in FIG. 19A, the provisional rendering result has height overflow. FIG. 19B shows a provisional rendering result obtained during the course of the rendering repeated with the character size reduced in increments of 1 px. In this provisional rendering result, the character size is 1.3 px. The text element causes height overflow even though the character size is 1.3 px.

FIG. 19C shows a provisional rendering result obtained using a character size of 12 px. In this case, the text fits within the display area. That is, the fitting character size is 12 px. Based on the fitting character size, the condensation ratio is calculated to be 0.60 (=12/20). The width condensation ratio calculated to be 0.60 is lower than the minimum width condensation ratio set to 0.65, indicating that it is impossible to replace the text through the width condensation process. In this case, the width condensation is not performed on the text, and the text is displayed as shown in FIG. 19C as the final display.

Figure 20A:
FIGS. 20A to 20C are diagrams illustrating an operation example according to the first embodiment.
Figure 20B:
Figure 20C:
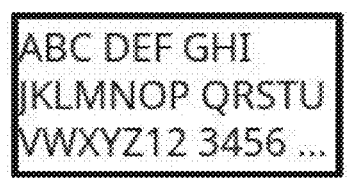

FIGS. 20A to 20C are diagrams showing an operation example in which neither reducing the character size nor performing the width condensation allows text to fit within the display area. Text of the text element shown in FIGS. 20A to 20C is "ABC DEF GHI JKLMNOP QRSTU VWXYZ12 3456 7890", and the specified character size thereof is 16 px.

FIG. 20A shows a provisional rendering result obtained using the specified character size. As shown in FIG. 20A, the provisional rendering result has height overflow. FIG. 20B shows a provisional rendering result obtained using a character size reduced to the minimum system character size (12 px). As shown in FIG. 20B, the provisional rendering result has height overflow. Accordingly, the minimum system character size (12 px) is used as the character size of the text.

Since the character size is smaller than the minimum width-condensable character size (15 px), the width condensation is not performed. The width condensation ratio for the text is therefore 100% (no width condensation). Since the text does not fit within the display area, the ellipsis display attribute of the text is set to "display ON". FIG. 20C is a diagram showing the final display of the text element. The text is displayed using the minimum system character size (12 px) without the width condensation. The text is displayed with an omission.

FIGS. 21A to 21E are diagrams showing an operation example in which using the minimum specifiable character size does not allow text to fit within the display area, but performing the width condensation allows the text to fit within the display area. Text of the text element shown in FIGS. 21A to 21E is "ABC DEF GHI JKLMNOP QRSTU". The specified character size thereof is 20 px, and the minimum specifiable character size thereof is 15 px.

Figure 21A:
FIGS. 21A to 21E are diagrams illustrating an operation example according to the first embodiment.
Figure 21B:
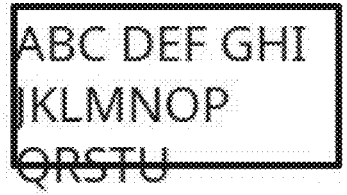

FIG. 21A shows a provisional rendering result obtained using the specified character size. As shown in FIG. 21A, the provisional rendering result has height overflow. FIG. 21B shows a provisional rendering result obtained using a character size reduced to the minimum specifiable character size (15 px). As shown in FIG. 21B, the provisional rendering result has height overflow. Accordingly, the minimum specifiable character size (15 px) is used as the character size of the text.

Figure 21C:
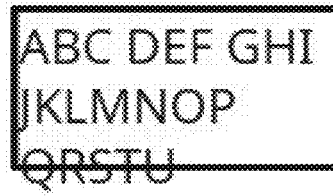
Figure 21D:
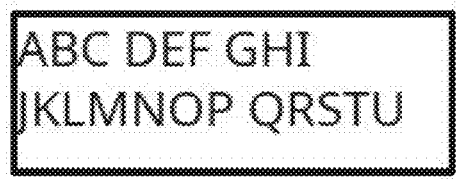
Figure 21E:
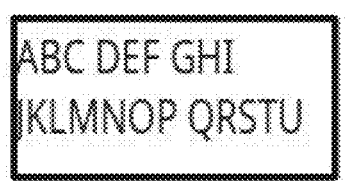

Subsequently, the width condensation ratio is determined. FIG. 21C is a diagram showing a provisional rendering result obtained when the provisional rendering is performed by increasing the width of the display area to a width (1.17 times) corresponding to a width condensation ratio of 85%. As shown in FIG. 21C, the provisional rendering result has area overflow. FIG. 21D is a diagram showing a provisional rendering result obtained when the provisional rendering is performed by increasing the width of the display area to a width (1.33 times) corresponding to a width condensation ratio of 75%. As shown in FIG. 21D, the provisional rendering result does not have area overflow. Consequently, 75% is used as the width condensation ratio. FIG. 21E is a diagram showing the final display of the text element for which an additional width condensation ratio is set to display the text using the original width.

FIGS. 22A to 22E are diagrams showing an operation example in which neither using the minimum specifiable character size nor performing the width condensation allows text to fit within the display area, and the text is displayed with an omission. Text of the text element shown in FIGS. 22A to 22E is "ABC DEF GHI JKLMNOP QRSTU VWXYZ". The specified character size thereof is 20 px, and the minimum specifiable character size thereof is 15 px.

Figure 22A:
FIGS. 22A to 22E are diagrams illustrating an operation example according to the first embodiment.
Figure 22B:
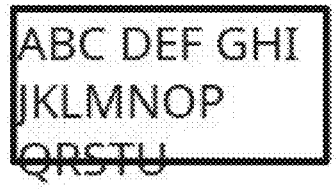

FIG. 22A shows a provisional rendering result obtained using the specified character size. The provisional rendering result has height overflow. FIG. 22B shows a provisional rendering result obtained using a character size reduced to the minimum specifiable character size (15 px). The provisional rendering result has height overflow. Accordingly, the minimum specifiable character size (15 px) is used as the character size of the text.

Figure 22C:
Figure 22D:
Figure 22E:
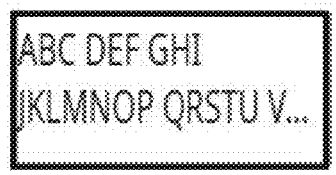

Subsequently, the width condensation ratio is determined. In this example, the provisional rendering is repeated by increasing the width of the display area to a width (1.17 times) corresponding to a width condensation ratio of 85%, to a width corresponding to a width condensation ratio of 75%, and to a width corresponding to a width condensation ratio of 65%, and all of the provisional rendering results thus obtained have area overflow. FIG. 22C is a diagram showing the provisional rendering result obtained when the provisional rendering is performed by increasing the width of the display area to the width (1.53 times) corresponding to a width condensation ratio of 65%. The provisional rendering result has area overflow. In this case, the ellipsis display attribute is set to "display ON", and 65% is used as the width condensation ratio. The text is displayed with an omission. The text is displayed with an ellipsis and appears as "ABC DEF GHI JKLMNOP QRSTU V . . . " as shown in FIG. 22D. FIG. 22E is a diagram showing the final display of the text element for which an additional width condensation ratio is set to display the text using the original width.

Figure 23A:
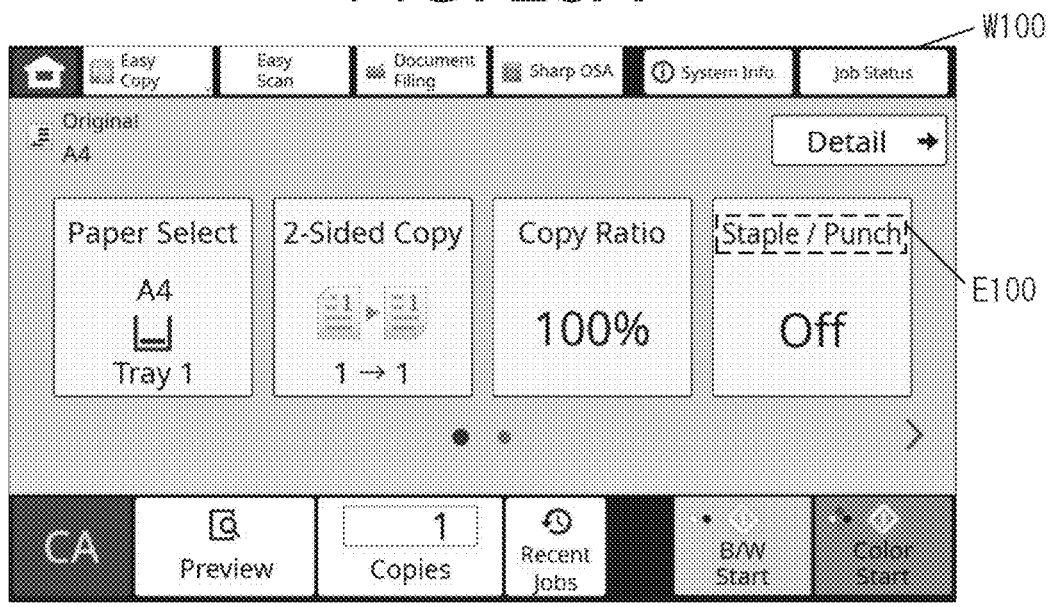
FIGS. 23A and 23B are diagrams illustrating an operation example according to the first embodiment.
Figure 23B:
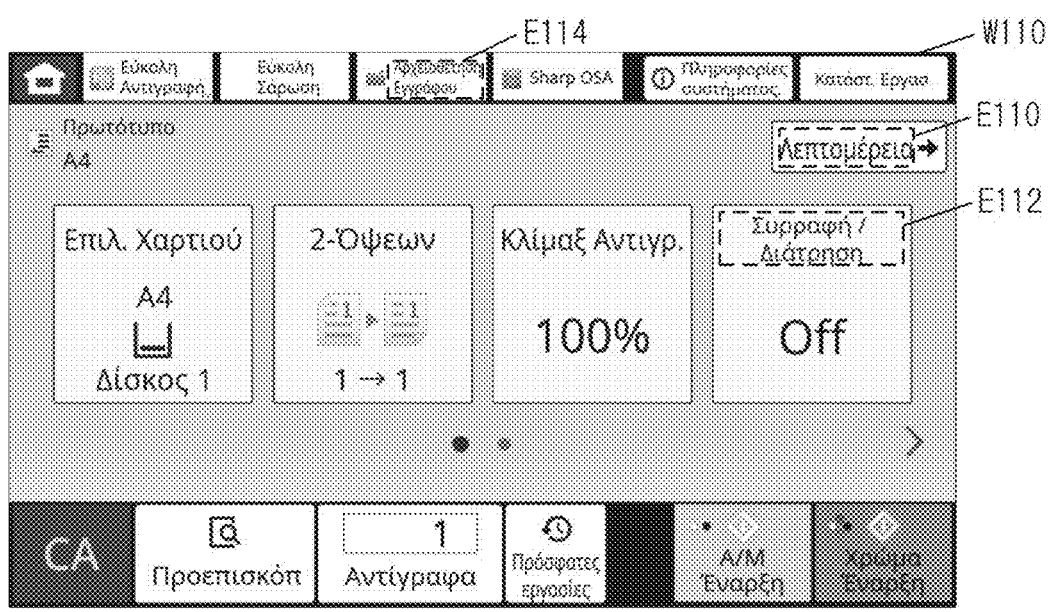

The following describes a copying function operation screen of the image forming apparatus 10. FIG. 23A is a diagram illustrating an operation screen W100 in which text is displayed in English. FIG. 23B is a diagram illustrating an operation screen W110 in which text is displayed in Greek.

In an area E100 in FIG. 23A, a text element for which the multi-line area is specified is displayed. In this example, the specified character size of the text element is 32 px, and the height of the display area is 60 px. In this case, rendering the text using the specified character size results in word wrap to split the text into two lines (the word "Punch" wraps onto the next line in provisional rendering). Since the height of the display area is 60 px, displaying the characters using the specified character size set to 32 px results in height overflow. For this text element, the height overflow process is performed, determining that using a character size of 29 px allows the text to be displayed within the display area fitting character size=29 px). Furthermore, the theoretical width condensation value (width condensation ratio) is calculated to be 0.90 (=29/32) through the width condensation determination process in the width condensation process, determining that performing the width condensation allows the text to be displayed within the display area using the specified character size as is. Accordingly, the width condensation is performed on this text element, and the text is displayed in a single line by applying a width condensation ratio of 90% using a character size of 32 px without changing the specified character size.

In an area E110 in FIG. 23B, a text element for which the single-line fixed area is specified is displayed, and the specified character size thereof is 32 px. Placing the text using the specified character size on this area results in the text overflowing the width of the display area. However, the single-line fixed area process is performed, and thus a width condensation ratio of 75% is applied.

In an area E112 in FIG. 23B, a text element for which the multi-line area is specified is displayed. The specified character size is 32 px, and the height of the display area is 60 px. Rendering the text using the specified character size results in word wrap to split the text into two lines. Since the height of the display area is 60 px, displaying the characters using the specified character size set to 32 px results in height overflow. For this text element, the height overflow process is performed, determining that the fitting character size is 25 px. Furthermore, the width condensation determination process is performed, determining that using the specified character size as is does not allow the text to be displayed in the display area. As a result, the text is automatically set to a character size of 25 px and displayed in two lines without the width condensation.

In an area E114 in FIG. 23B, a text element for which the multi-line area is specified is displayed. The specified character size is 18 px. Rendering the text using the specified character size only results in width overflow and does not result in height overflow. Based on the width of the placed text area and the width of the display area, the width condensation ratio is calculated to be 79%. Accordingly, the text is displayed by applying the width condensation ratio calculated to be 79%.

As described above, the image forming apparatus 10 according to the present embodiment can display various types of text using optimal character representations without having to predetermine a final display size for each type of text. Even in a configuration that permits switching of text resources of text to lie displayed, such as between English and Greek, the image forming apparatus 10 according to the present embodiment can display text in different languages by applying the most appropriate form for each language through the same language-insensitive display process.

Note that the following modifications may be made to the processes described above. For example, lower limit values of the character size such as the minimum specifiable character size or the minimum system character size may be automatically switchable depending on some factors such as screen resolution, viewing distance, environmental brightness, and screen contrast. This is because these factors change the readability of text.

For another example, according to the description given above, the character size is reduced in increments of 1 px in Step S400 of the height overflow process shown in FIG. 7. However, reducing the character size in increments of 1 px (control increment, is merely an example. The control increment may be 2 px and does not have to be an integer value. Furthermore, the unit thereof does not have to be px and may be selected as appropriate from among those usable as a unit for specifying size, such as pt (point) or percent relative to the base size. Furthermore, the amount by which the character size is changed does not have to be fixed. That is, the amount by which the character size is changed may be controlled to vary as appropriate. For example, a character size of larger than or equal to 20 px may be reduced in increments of 2 px, and a character size of smaller than 20 px may be reduced in increments of 1 px.

Furthermore, the processes may be changed depending on the language to be displayed. For example, the minimum width condensation ratio may be changeable on a language-by-language basis (on a font-by-font basis). In general, Kanji characters are more complex as having more lines and have a higher tendency to be less readable than alphabetical characters when transformed narrower. The value of the minimum width condensation ratio may therefore be specified individually for each language or font to be displayed, such as a minimum width condensation ratio of 75% for Japanese or a minimum width condensation ratio of 65% for English.

Furthermore, the minimum width condensation ratio may be changeable depending on the character size. The readability of complex characters decreases with a decrease in size of the characters. It can be therefore undesirable to perform the width condensation on text in a smaller character size in the same manner as on text in a larger character size. In such a case, a configuration may be adopted in which the minimum width condensation ratio is changed depending on the character size.

For another example, according to the description given above, the width condensation in the foregoing embodiment is implemented through a transformation process of character images. Alternatively, the width condensation may be implemented using a variable font or a condensed font. For example, a beautiful width condensation representation may be easily achieved by applying the calculated width condensation ratio as a parameter for the character width of a variable font. In a configuration in which condensed fonts are available as displayable fonts and the display system permits the use of the condensed fonts, the specified font may be controlled to be displayed after being changed to a condensed font corresponding to the calculated width condensation ratio. With an environment that allows for the use of condensed fonts each having a different condensation degree, it is possible to achieve a more beautiful character representation.

The setting value (threshold) of the minimum system character size, for example, may be switchable between a plurality of patterns depending on the size and resolution of the display 140, and the type and purpose of the screen to be displayed. Alternatively, the setting value may always be specified at the content end.

For another example, according to the description given above, the width of the display area is increased for determining whether or not the target element causes area overflow in the width condensation process and the width condensation process for height overflow. Alternatively, the shape of characters may be changed according to a relevant width condensation ratio, and the resultant shape-changed characters may be used to determine whether or not the target element causes area overflow. In this case, the controller 100 may determine that the target element does not cause area overflow if the shape-changed characters fit within the display area, and determine that the target element causes area overflow if the shape-changed characters fail to fit within the display area. In this way, the controller 100 can determine the width condensation ratio based on the shape-changed characters.

For another example, according to the description given above, the attribute value of the automatic reduction attribute is set on a text element-by-text element basis. However, in the case of content in which all text elements can be subjected to the same automatic reduction process, the automatic reduction attribute does not need to be specified. In this case, a method for the automatic reduction process to be performed on the text elements is preset, and the controller 100 performs the automatic reduction process based on the preset method for the automatic reduction process.

The minimum width condensation ratio may be set on an element-by-element basis. The minimum specifiable character size may be specified as a percentage (for example, 50%) relative to the specified character size, rather than as a specific value. The minimum specifiable character size may be incorporated into the minimum system character size. In this case, the specifiable character size is not specified on a text element-by-text element basis, and the lower limit of the character size for all text elements is used as the minimum system character size.

For another example, according to the description given above, three fixed values of the width condensation ratio are tested in the width condensation process for height overflow shown in FIG. 9. However, the number of stages in which the test is performed or the rate of variation may be determined as appropriate. The type of the width condensation ratio to be used may vary depending on the character size of the target element. Width condensation ratios to be tested may be determined using percentages relative to the character size or may be varied in equal increments. For another example, according to the description given above, 65%, which is the same as the minimum width condensation ratio, is employed as the minimum selectable value of the width condensation ratio. However, a different value may be employed.

For another example, according to the description given above, the foregoing embodiment displays content described in HTML/CSS in a general-purpose web browser engine as a display system. However, the display system is not limited to a web browser. No particular limitations are placed on the display engine as long as the display engine is a rendering system that lays out text, and that is capable of performing an actual text display process without reflecting the process on screens and capable of obtaining the results of the display process.

For another example, according to the description given above, the display device according to the present embodiment is applied to the image forming apparatus 10, and the controller 100 sets the size of text to be displayed on the display 140. However, the display device according to the present embodiment may be implement by a device other than the image forming apparatus 10. For example, the display device described above may be implemented by an image reading device such as a scanner, or by an automatic teller machine or a machine tool. That is, the display device described above may be implemented by any device including a display. Furthermore, the display device described above may be implemented by a device incorporating a program or library for performing the processes described in FIGS. 4 to 9.

As described above, the image forming apparatus according to the present embodiment can determine parameters (style information) for displaying text based on results of display by the display engine. Thus, the content creator for the image forming apparatus according to the present embodiment does not need to define in advance optimal settings for individual display elements, and can display text appropriately even if the behavior of the display engine changes due to, for example, functional improvements or failures. Furthermore, the content creator does not need to consider differences between display engines. The content creator can also appropriately display dynamic text for which an advance verification is difficult and text in a content representation subject to change in layout depending on screen size, as typified by responsive design. That is, the content creator can cause the image forming apparatus to automatically display easy-to-read text without having to specify in advance a character size for each display element by considering the size of the display area and the number of displayable characters so that the text does not overflow.

The image forming apparatus according to the present embodiment displays text not only by selecting a character size that allows the text to fit within the display area but also by condensing the width of the characters in a character size that resolves height overflow. Thus, when displaying text and numbers in an area having a specific size, the image forming apparatus can display as many characters as possible in the given display area using the largest possible character size, increasing the readability. Furthermore, the image forming apparatus can always automatically display text using an appropriate size even with text content variation, even with display area size variation, and even with language variation.

Furthermore, since the image forming apparatus according to the present embodiment determines parameters (style information) for displaying text based on results of display by the display engine, the image forming apparatus can handle any languages using the same process. Thus, when translating and replacing text to implement a multilingual user interface (UI), the image forming apparatus can automatically adjust the display manner for the text to be displayed while preventing the text from extending beyond the display area without finely controlling the number of characters (display width of a character string), facilitating deployment of the UI in multiple languages.

2. Second Embodiment

Next, a second embodiment will be described. According to the second embodiment, the width condensation is performed after changing the character size of text to a smaller character size if performing the width condensation in the width condensation process according to the first embodiment does not allow the text in the specified character size to fit within the display area.

In the width condensation determination process (Step S504 to Step S510 in FIG. 8) in the width condensation process according to the first embodiment, the controller 100 performs the provisional rendering after changing the character size of the target element back to the specified character size to determine whether or not the target element causes area overflow. If the target element causes area overflow, the character size of the target element is set to the fitting character size However, in some cases where the target element causes area overflow, performing the width condensation after slightly reducing the character size of the target element allows the text to fit within the display area.

According to the present embodiment, therefore, the controller 100 performs the following processes upon determining in Step S510 that the target element causes area overflow (Yes in Step S510).

(1) Reduce the character size by an amount (for example, by 1 px), set the width condensation ratio to the minimum width condensation ratio, and perform the provisional rendering.
(2) Repeat (1) until area overflow is resolved,
(3) Set the character size of the target element to a character size that resolves area overflow and set the width condensation ratio of the target element to the minimum width condensation ratio.

In this way, the controller 100 can set the character size of the target element to the largest possible character size instead of displaying the target element using the fitting character size.

Note that the provisional rendering needs to be repeated more times until the display parameters are determined in this processing method than in the method according to the first embodiment. The controller 100 may therefore perform the processes described above on the condition that the processing load of the provisional rendering does not significantly affect screen displaying responsiveness. Furthermore, in order to reduce the processing load of the provisional rendering, the controller 100 may reduce the loop count of the process in (1) by reducing the character size in larger increments or by restricting the process in (1) to a predetermined loop count. In this case, the controller 100 may perform the process in Step S514 in FIG. 8 if the target element causes area overflow even after the process in (1) has been repeated according to the predetermined loop count.

An administrator of the image forming apparatus 10, for example, may execute the above-described processes by using, as the minimum width condensation ratio, a value slightly larger than the value mentioned in the first embodiment to achieve a balance between the character size and the width condensation ratio.

The image forming apparatus according to the present embodiment accommodates cases where performing the width condensation after slightly reducing the character size of the target element allows the text to fit within the display area.

3. Third Embodiment

Next, a third embodiment will be described. According to the third embodiment, the multi-line area process is performed also on text elements for which the single-line fixed area is specified according to the first embodiment.

In the first embodiment, according to the description given above, either the multi-line area process or the single-line fixed area process is performed depending on the automatic reduction attribute of the text element. Alternatively, the process for the text element for which the single-line fixed area is specified may be performed in the multi-line area process. For example, the content creator may display a text element for which the single-line fixed area is specified through the multi-line area process by restricting the height of the placed text area of the text element to a height corresponding to a single line and specifying, as the minimum specifiable character size, a value that does not result in a height corresponding to two or more lines. In this case, the content creator does not need to specify an automatic condensation process to be applied by specifying either the single-line fixed area or the multi-line area as the automatic reduction attribute of the text element.

According to the present embodiment, the controller 100 does not perform the process in Step S106 (does not determine whether or not the single-line fixed area is specified for the target element) in the main process shown in FIG. 4, but performs the multi-line area process in Step S108 for all selected target elements.

As described above, the image forming apparatus according to the present embodiment can consolidate the automatic reduction process to the multi-line area process.

4. Fourth Embodiment

Next, a fourth embodiment will be described. According to the fourth embodiment, the object for which the display size is set is an object other than text according to the first embodiment, and such an object is displayed in the display area using an appropriate size.

For example, the processes described in association with the first embodiment to the third embodiment may also be applied to an object that includes a plurality of component elements within an area having a predetermined shape (for example, rectangular area), such as handwritten characters or emoji and in which each of the component elements can have a line break inserted at any position.

For example, the controller 100 reduces the size of the component elements (height and width of the component elements) by a predetermined percentage (for example, 5%) in Step S400 in FIG. 7. This allows the controller 100 to obtain a size of the component elements that allows the object to fit within the height of the display area. The controller 100 further performs the width condensation determination process to determine whether or not performing the width condensation on the component elements allows the object to be displayed within the display area and whether or not reducing the size of the component elements allows the object to be displayed within the display area. Based on the determination result, the controller 100 can determine the size of the component elements (size and width condensation ratio of the component elements) and render the object in the display area.

As described above, the image forming apparatus according to the present embodiment can also render (display) a non-text object within the display area using an appropriate size.

5. Modification Example

The present disclosure is not limited to the embodiments described above, and various modifications may be made thereto. That is, the technical scope of the present disclosure also includes embodiments that may be obtained by combining technical measures that are modified as appropriate without departing from the gist of the present disclosure.

Although some of the foregoing embodiments are described separately for convenience of explanation, it is needless to say that such embodiments may be combined and implemented within a technically allowable range. For example, the second embodiment and the third embodiment may be combined with each other. In this case, the image forming apparatus can perform the multi-line area process on a text element for which the single-line fixed area is specified and a text element for which the multi-line area is specified. Furthermore, even if the target element is determined to cause area overflow in the width condensation determination process, reducing the character size allows the text to fit within the display area.

The program(s) that operates on each of the devices in the foregoing embodiments is a program that controls the CPU or the like (program that causes a computer to function) so as to implement the functions according to the foregoing embodiments. The information handled by these devices is temporarily accumulated in a temporary storage device (for example, random access memory (RAM)) during the processing, is then stored in various storage devices such as read only memory (ROM) and an HDD, and is read, corrected, and written by the CPU as needed.

Here, a recording medium that stores the program may be, for example, any of a semiconductor medium (for example, ROM and a non-volatile memory card), an optical recording medium/magneto-optical recording medium (for example, a digital versatile disc (DVD), a magneto optical disc (MO), a Mini Disc (MD), a compact disc (CD), and a Blu-ray (registered trademark) Disc (BD)), and a magnetic recording medium (for example, a magnetic tape and a flexible disk). Furthermore, not only are the functions of the foregoing embodiments implemented through execution of the loaded program, but the functions of the present disclosure may also be implemented through processing performed in cooperation with, for example, an operating system or other application programs on the basis of instructions of the program.

For market distribution, the program may be stored and distributed in a portable recording medium or transferred to a server computer connected via a network such as the Internet. In this case, a storage device of the server computer is obviously included in the present disclosure.

What is claimed is:

1. A display device comprising:
    a display; and
    a controller, wherein
    the controller
        provisionally places an object with a non-display attribute on a display area of the display,
        determines a display size of the object, as measured in pixels on the display, that allows the object to be contained within the display area by comparing a size of the provisionally-placed object with a size of the display area, and
        renders, in pixels on the display, the provisionally-placed object in the display area using the determined display size of the object,
    wherein the object comprises a plurality of lines of character strings, and
    upon determining that a character size, in pixels, specified for the plurality of lines of character strings exceeds a height of the display area and reducing the specified character size allows the object to fit within the display area, the controller determines the size, in pixels, of the object by setting a width condensation ratio of the specified character size to a ratio between the specified character size and the reduced character size, such that the object fits within the display area using the specified character size as is.

2. The display device according to claim 1, wherein the controller calculates, as the display size of the object, a size that allows ends of a width or a height of the object to be in a vicinity of corresponding ends of the display area.

3. The display device according to claim 1, wherein
    the object is a character string, and
    the controller determines the display size of the object that allows the object to be contained within the display area by changing a display size of the character string.

4. The display device according to claim 3, wherein the controller determines the display size of the object that allows the object to be contained within the display area by reducing a character size of the character string.

5. The display device according to claim 3, wherein the controller determines the display size of the object that allows the object to be contained within the display area by changing a shape of characters in the character string to reduce a display width of the characters and using the shape-changed characters.

6. The display device according to claim 3, wherein the controller further renders the character string by omitting a portion of the character string if changing the display size of the character string does not allow the object to be contained within the display area.

7. A method for controlling a display device, the method comprising:
    provisionally placing, using a controller, an object with a non-display attribute on a display area of the display device;
    determining, using the controller, a display size of the object, as measured in pixels on the display device, that allows the object to be contained within the display area by comparing a size of the provisionally-placed object with a size of the display area; and
    rendering, in pixels on the display device, using the controller, the provisionally-placed object in the display area using the determined display size of the object,
    wherein the object comprises a plurality of lines of character strings, and
    upon determining, by the controller, that a character size, in pixels, specified for the plurality of lines of character strings exceeds a height of the display area and reducing the specified character size allows the object to fit within the display area, the controller determines the size, in pixels, of the object by setting a width condensation ratio of the specified character size to a ratio between the specified character size and the reduced character size, such that the object fits within the display area using the specified character size as is.

8. A display device comprising:
    a display; and
    a controller, wherein
    the controller
        provisionally places an object on a display area of the display,
        determines a display size of the object, as measured in pixels on the display, that allows the object to be contained within the display area by comparing a size of the object with a size of the display area, and
        renders, in pixels on the display, the object in the display area using the determined display size of the object,
    wherein the object comprises a plurality of lines of character strings, and
    upon determining that a character size, in pixels, specified for the plurality of lines of character strings exceeds a height of the display area and reducing the specified character size allows the object to fit within the display area, the controller determines the size, in pixels, of the object by setting a width condensation ratio of the specified character size to a ratio between the specified character size and the reduced character size, such that the object fits within the display area using the specified character size as is.

* * * * *